(12) United States Patent
Namaki et al.

(10) Patent No.: US 11,514,049 B2
(45) Date of Patent: Nov. 29, 2022

(54) QUALITY-AWARE KEYWORD QUERY SUGGESTION AND EVALUATION

(71) Applicants: Huawei Technologies Co., Ltd., Shenzhen (CN); Washington State University, Pullman, WA (US)

(72) Inventors: Mohammad Hossein Namaki, Pullman, WA (US); Yinghui Wu, Pullman, WA (US); Xin Zhang, Pullman, WA (US); Yonghua Ding, San Jose, CA (US)

(73) Assignees: Huawei Technologies Co., Ltd., Shenzhen (CN); Washington State University, Pullman, WA (US)

( * ) Notice: Subject to any disclaimer, the term of this patent is extended or adjusted under 35 U.S.C. 154(b) by 0 days.

(21) Appl. No.: 17/096,292

(22) Filed: Nov. 12, 2020

(65) Prior Publication Data

US 2021/0064620 A1    Mar. 4, 2021

Related U.S. Application Data

(63) Continuation of application No. PCT/CN2019/090229, filed on Jun. 6, 2019.
(Continued)

(51) Int. Cl.
*G06F 16/2453* (2019.01)
*G06F 16/215* (2019.01)
*G06F 16/9032* (2019.01)

(52) U.S. Cl.
CPC ...... *G06F 16/24545* (2019.01); *G06F 16/215* (2019.01); *G06F 16/90328* (2019.01)

(58) Field of Classification Search
USPC ........................................................ 707/719
See application file for complete search history.

(56) References Cited

U.S. PATENT DOCUMENTS

| 8,392,435 B1 | 3/2013 | Yamauchi |
| 2007/0100803 A1* | 5/2007 | Cava ............... G06F 16/3322 |

(Continued)

FOREIGN PATENT DOCUMENTS

| CN | 102254039 A | 11/2011 |
| WO | WO-2019233463 A1 | 12/2019 |

OTHER PUBLICATIONS

"International Application No. PCT/CN2019/090229, International Search Report and Written Opinion dated Sep. 5, 2019", (dated Sep. 5, 2019), 8 pgs.

*Primary Examiner* — Cam Linh T Nguyen
(74) *Attorney, Agent, or Firm* — Schwegman Lundberg & Woessner, P.A.

(57) ABSTRACT

A query suggestion to expand an initial query is calculated whereby the cost of the expanded initial query is bounded in both time and quality. The user validates a subset of the top-n answers Q(G) to a query Q and provides adjusted configuration parameters. The top-n diversified δ-expansion terms Q' are calculated from the validated subset of answers Q(G) to the query Q and are provided to an interactive user interface for selection. Answers Q'(G) for the top-n diversified δ-expansion terms Q' are cost bounded by cost threshold δ and exploration range r specified by the user. The user selects a new term of terms Q' and an incremental query evaluation of the new term is invoked to compute expanded query answers Q'(G) by incrementally updating the validated subset of answers Q(G), without re-evaluating an expanded query Q' including the new term from scratch.

20 Claims, 15 Drawing Sheets

Related U.S. Application Data

(60) Provisional application No. 62/780,926, filed on Dec. 17, 2018, provisional application No. 62/682,004, filed on Jun. 7, 2018.

(56) References Cited

U.S. PATENT DOCUMENTS

| | | |
|---|---|---|
| 2008/0114751 A1 | 5/2008 | Cramer et al. |
| 2008/0301128 A1 | 12/2008 | Gandert et al. |
| 2010/0198821 A1* | 8/2010 | Loritz .................. G06F 40/247 707/765 |
| 2011/0295840 A1* | 12/2011 | Ciaramita ........... G06F 16/2453 707/719 |
| 2014/0379490 A1* | 12/2014 | Schnabl ............. G06Q 30/0244 705/14.71 |
| 2015/0363488 A1* | 12/2015 | Hoyne ................ G06F 16/3344 707/771 |
| 2015/0363821 A1* | 12/2015 | Hoyne ............... G06Q 30/0246 705/14.42 |
| 2016/0063093 A1 | 3/2016 | Boucher et al. |

* cited by examiner

QUALITY-AWARE KEYWORD QUERY SUGGESTION AND EVALUATION

CROSS-REFERENCE TO RELATED APPLICATIONS

This application is a continuation application of International Application No. PCT/CN2019/090229, filed Jun. 6, 2019, which claims the benefit of priority to U.S. Provisional Patent Application No. 62/682,004, filed Jun. 7, 2018, entitled "Apparatus and Method for Keyword Query Suggestion and Evaluation on Large Networks," and U.S. Provisional Application No. 62/780,926, filed on Dec. 17, 2018, entitled "Quality-Aware Keyword Query Suggestion and Evaluation," both of which are hereby incorporated by reference in their entirety.

TECHNICAL FIELD

The present disclosure is related to keyword search and keyword query refinement and, in particular, to query suggestion on large networks, such as knowledge graphs, social media, and e-commerce networks, and in suggesting relevant and diversified terms to expand the user's initial query such that the cost of query is bounded in both time and quality perspectives.

BACKGROUND

Keyword search (KWS) has been routinely used to explore and understand graph data. A keyword query $Q$ is a set of terms $\{t_1, \ldots, t_l\}$. Given a keyword query $Q$ and a graph G, KWS returns a list of answers $Q(G)$, where each answer $G_Q$ is a subgraph of G that contains a set of content nodes that matches the keywords in $Q$. The answers $G_Q$ are usually defined as distinct rooted trees, minimum weighted Steiner trees, or subgraphs for distinct rooted-based (DR) queries, Steiner tree-based (ST), and Steiner graph-based (SG) queries, respectively. The subgraph can be, for example, a minimal single rooted tree, a weighted Steiner tree, or an r-clique (nodes with pairwise distance bounded by a threshold r), when $Q$ is defined as a DR, ST, or SG query, respectively. The answer cost of $G_Q$ is determined by aggregating the distance among its content nodes. Answers with low cost are preferred. In the following description, it will be appreciated that quality and cost may be used interchangeably and that the quality of answers is higher if their cost is lower. In practice, the top-k answers are often returned and ranked by a corresponding quality function F that minimizes the distance among content nodes.

Improvements in exploratory graph searching is needed due to the nontrivial task of query construction in large heterogeneous graphs. Recent efforts in exploratory methods for KWS use user-friendly interfaces that interleave query refinement and query evaluation for graph exploration. Beyond conventional query-response paradigms, an exploratory search involves a sequence of search sessions. Each session suggests queries, receives feedback from users on queries and results, and re-evaluates new queries.

However, effective graph exploration with KWS is challenging, as users may not be aware of the schema and structure of the graph. Query refinement may generate queries that have no or low-quality answers for established KWS models in databases. Due to the intrinsic ambiguity of the keywords, users often need to revise the queries multiple times to get answers that are relevant with low answer cost (and high quality). This is a daunting task especially when no prior knowledge of G is provided. Moreover, re-evaluating new queries from scratch is typically expensive. For example, computing optimal answers for a given ST or SG query is NP-hard. Users often have no control over either the answer quality or the time cost during the exploratory search and may have to wait a long time during exploratory sessions.

Existing KWS solutions are mostly designed for relational databases, document retrieval, and web search, not for large heterogeneous networks. Such solutions mostly assume the presence of query logs and a user's search history and do not suggest what to do when such information is not available. Moreover, existing solutions do not consider the cost and time of evaluating the suggested queries or provide any limits on the costs of the answers.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

Keyword queries have been widely adopted to explore and understand graph data. Due to the intrinsic ambiguity of graph queries, it is desirable to develop exploratory methods that interleave query refinement (expansion) and evaluation to progressively find useful information. To support effective graph exploration, the quality of both suggested keywords and answers should be guaranteed during the exploration. Accordingly, graph exploration with KWS is provided that interleaves query refinement and query evaluation with provable quality and efficiency guarantees for all DR, ST and SG (r-clique) queries and provides parameters to enable a tunable quality requirement.

Particular techniques are described herein for providing an interactive keyword-based graph exploration system and method that uses keywords to support effective access and exploration of large graphs while enabling user-specified, tunable answer quality guarantees. The methods described herein interleave two tasks: (1) Quality-preserving query refinement. Given a keyword query $Q$ and answer $Q(G)$ of $Q$ in graph G, and a user-specified bound, it suggests refined queries $Q'$ that are guaranteed to have answers that extend $Q(G)$ with quality no worse than the bound. (2) Incremental Answer Evaluation. Given a refined query $Q'$, answer $Q(G)$ and a set of nodes of interests, it updates $Q(G)$ to the best answer $Q'(G)$ that contains the required content nodes. The exploratory method described herein is shown to be feasible for established keyword query classes that compute distinct rooted trees, Steiner trees, and Steiner graphs, respectively, by providing the corresponding query and incremental answer evaluation algorithms. Moreover, these algorithms incur bounded cost determined by $Q(G)$ and $Q$ at any session of exploratory search, independent of the size of G. Also, validated answers of the initial query are used to incrementally evaluate the suggested query refinement answers.

In sample embodiments, the systems and methods described herein interleave keyword query suggestion, which generates keyword queries that expand the original query, and query evaluation, that returns the answers to the suggested queries for feedback. The systems and methods described herein provide quality-aware exploration by suggesting keyword queries that have low answer cost (and high answer quality) and incremental query evaluation to update the query answers with a bounded time cost. The system and method described herein identifies and leverages substructures in the graph that augment original answers for query explanation and evaluation with provable cost bounds. Users may set parameters to trade the quality of query answers with their evaluation cost by tuning the bound of answer cost in an ad-hoc manner. Graph exploration is supported for the DR, ST, and SG query classes with bounded time cost and guarantees on query result quality. The resulting system can be embedded as a part of search engines over networks to increase the usability of the search by guiding the user in the information gathering process. It will further be appreciated that by representing other databases, documents, and web pages as a heterogeneous network, the system described herein can be utilized for exploratory searches of other database technologies.

According to a first aspect of the present disclosure, there is provided an apparatus for generating a query suggestion to expand an initial query such that a cost of the expanded initial query is bounded in both time and quality. The apparatus includes an interactive user interface that receives a configuration of a data graph G, keywords of a query Q, an exploration range r, a cost threshold δ, and validated answers Q(G) to the query Q from a user and presents query answers to the user. a non-transitory memory storage comprising instructions, and one or more processors in communication with the memory storage. The one or more processors execute the instructions to invoke a quality-aware query expansion module that receives at least a subset of validated answers Q(G) to the query Q, computes top-n diversified δ-expansion terms Q' utilizing the subset of validated answers Q(G) to the query Q, and provides the top-n diversified δ-expansion terms Q' to the interactive user interface for selection. In sample embodiments, answers Q'(G) for the top-n diversified δ-expansion terms Q' are cost bounded by cost threshold δ and are within exploration range r. The one or more processors also execute the instructions to invoke an incremental query evaluation module that receives via the interactive user interface a selected term of the top-n diversified δ-expansion terms Q' and computes expanded query answers Q'(G) by incrementally updating the subset of validated answers Q(G), without re-evaluating an expanded query Q' including the selected term from scratch, and provides the expanded query answers Q'(G) to the interactive user interface for display. A memory and indexing device are also provided to store at least one data graph and to support distance queries and traversal operations of the identified data graph G by the quality-aware query expansion module and the incremental query evaluation module.

According to a second aspect of the present disclosure, there is provided a computer-implemented method of generating a query suggestion to expand an initial query such that a cost of the expanded initial query is bounded in both time and quality. The method includes the steps of receiving via an interactive user interface a configuration of a data graph G, keywords of a query Q, an exploration range r, and a cost threshold δ; one or more processors invoking a keyword search of the data graph G using the keywords of the query Q; the one or more processors providing top-n answers Q(G) to the query Q to the interactive user interface for display; receiving from the interactive user interface a user selection of at least a subset of the top-n answers Q(G) to the query Q; receiving via the interactive user interface adjusted configuration parameters including at least the exploration range r; the one or more processors invoking a quality-aware query expansion to compute top-n diversified δ-expansion terms Q' from a validated subset of answers Q(G) to the query Q and to provide the top-n diversified δ-expansion terms Q' to the interactive user interface for selection, whereby answers Q'(G) for the top-n diversified δ-expansion terms Q' are cost bounded by cost threshold δ and are within exploration range r; receiving a user selection of a new term of the top-n diversified δ-expansion terms Q'; the one or more processors invoking an incremental query evaluation of the new term to compute expanded query answers Q'(G) by incrementally updating the validated subset of answers Q(G), without re-evaluating an expanded query Q' including the new term from scratch; and the one or more processors providing the expanded query answers Q'(G) to the interactive user interface for display.

According to a third aspect of the present disclosure, there is provided a non-transitory computer-readable media storing computer instructions for generating a query suggestion to expand an initial query such that a cost of the expanded initial query is bounded in both time and quality. When executed by one or more processors, the instructions cause the one or more processors to perform the steps of: receiving via an interactive user interface a configuration of a data graph G, keywords of a query Q, an exploration range r, and a cost threshold δ; invoking a keyword search of the data graph G using the keywords of the query Q; providing top-n answers Q(G) to the query Q to the interactive user interface for display; receiving from the interactive user interface a user selection of at least a subset of the top-n answers Q(G) to the query Q; receiving via the interactive user interface adjusted configuration parameters including at least the exploration range r; invoking a quality-aware query expansion to compute top-n diversified δ-expansion terms Q' from a validated subset of answers Q(G) to the query Q and to provide the top-n diversified δ-expansion terms Q' to the interactive user interface for selection, whereby answers Q'(G) for the top-n diversified δ-expansion terms Q' are cost bounded by cost threshold δ and are within exploration range r; receiving a user selection of a new term of the top-n diversified δ-expansion terms Q'; invoking an incremental query evaluation of the new term to compute expanded query answers Q'(G) by incrementally updating the validated subset of answers Q(G), without re-evaluating an expanded query Q' including the new term from scratch; and providing the expanded query answers Q'(G) to the interactive user interface for display.

In a first implementation of any of the preceding aspects, the quality-aware query expansion module receives k validated answers Q(G) from the interactive user interface and traverses the data graph G k times, each traversal starting from a set of source nodes in the i-th answer of Q(G), where i is the loop iteration up to k, and visits up to a bounded hop of neighbors of the set of source nodes using a single source shortest path (SSSP) iterator.

In a second implementation of any of the preceding aspects, the quality-aware query expansion module processes a query Q by computing an SSSP at an answer Q(G) and at each term of a visited node of Q(G) and computes an additional cost in the event that an initial answer Q(G) were to be extended to at least one expanded query answer Q'(G) by appending shortest paths from a source node of the set of source nodes to the visited node.

In a third implementation of any of the preceding aspects, when all SSSP iterations are completed, for each selected term, the quality-aware query expansion module computes a total additional cost introduced by extending the initial answer Q(G) to the expanded query answer Q'(G) including the selected term, and in the event that the total additional cost is larger than a threshold, the expanded query Q' is pruned; otherwise, the quality-aware query expansion module adds the selected term to a set of δ-expansion terms.

In a fourth implementation of any of the preceding aspects, upon discovery of all δ-expansion terms Q' in the data graph G, the quality-aware query expansion module picks top-n most relevant and diversified δ-expansion terms Q'.

In a fifth implementation of any of the preceding aspects, δ-expansion terms Q' for different keyword search query classes are obtained by using special source nodes for the SSSP iterations.

In a sixth implementation of any of the preceding aspects, the special source node for a distinct-rooted tree query class is a root of an i-th answer term $G_{Q_i}$.

In a seventh implementation of any of the preceding aspects, the special source node for a Steiner tree query class and an r-clique query class is a node set of an i-th answer term $G_{Q_i}$.

In an eighth implementation of any of the preceding aspects, the incremental query evaluation module implements an incremental approximation algorithm to compute the expanded query answer Q'(G) with various optimality guarantees for different respective keyword search query classes.

In a ninth implementation of any of the preceding aspects, receiving the adjusted configuration parameters comprises receiving at least one of a modified value for exploration range r that enables a user to specify how query answers may extend from a validated answer and a modified value for cost threshold δ that enables a user to specify what decrease in answer quality is tolerable.

In a tenth implementation of any of the preceding aspects, cost data for the expanded query answers Q'(G) is provided to the interactive user interface for display.

The method can be performed and the instructions on the computer readable media may be processed by the apparatus, and further features of the method and instructions on the computer readable media result from the functionality of the apparatus. Also, the explanations provided for each aspect and its implementation apply equally to the other aspects and the corresponding implementations. The different embodiments may be implemented in hardware, software, or any combination thereof. Also, any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

In the following description, reference is made to the accompanying FIGS. 1-12 that form a part hereof, and in which is shown by way of illustration specific embodiments which may be practiced. These embodiments are described in sufficient detail to enable those skilled in the art to practice the embodiments, and it is to be understood that other embodiments may be utilized, and that structural, logical, and electrical changes may be made without departing from the scope of the present disclosure. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a use specifically programmed machine.

Figure 1:
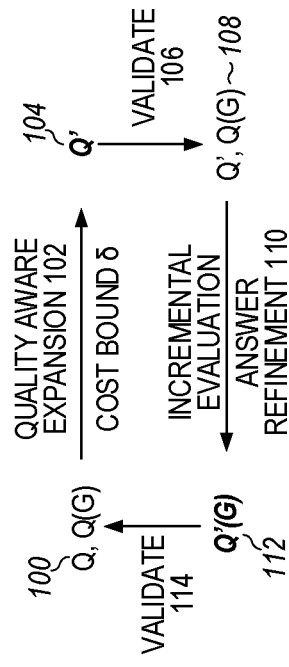
FIG. 1 illustrates the general steps of an exploratory search method that interleaves the task of quality-preserving query refinement and incremental evaluation of the answers in sample embodiments.

As noted above, the methods described herein interleave two tasks: Quality-preserving query refinement and Incremental Evaluation. As illustrated in FIG. 1, given a keyword query $Q$ and answer $Q(G)$ of $Q$ in graph G at 100, and a user-specified cost bound δ, quality-aware expansion 102 may be used to suggest refined queries $Q'$ (104) that are guaranteed to have answers that extend $Q(G)$ with quality no worse than the bound. Then, given the refined query $Q'$(104), answer $Q(G)$ and a set of nodes of interest, $Q(G)$ is updated (validated) 106 to the best answer $Q'(G)$ that contains the required content nodes at 108. Then, by providing the corresponding query and incremental answer evaluation algorithms, the answers of $Q(G)$ are incrementally evaluated at 110 to provide answer $Q'(G)$ (112) that is, in turn, validated (114) by the user to create a new query $Q$ and answer $Q(G)$ for a subsequent query. As will be explained below, such an exploratory method is feasible for established keyword query classes that compute distinct rooted trees, Steiner trees, and r-cliques, respectively, Moreover, these algorithms incur bounded cost only determined by $Q(G)$ and $Q$ at any session of exploratory search, independent of the size of G.

The systems and methods described herein enable quality-aware exploration over large graphs. Both topological and semantic information are considered. By leveraging topological closeness, the system and method only suggest relevant keywords whereby, if added to the query, the expanded query can be answered efficiently and effectively. The quality-aware exploration enables graphs to be explored with queries that have low-cost answers and low evaluation cost. Users only need to specify and to tune a threshold that characterizes expected answer cost. Suggestions for expanded queries are guaranteed by adding diversified new terms, where each query is guaranteed to have non-empty answers with bounded answer cost. That is, "bad" queries are not suggested that lead to high answer cost. The query expansion (refinement) is computed by constructing augmented subgraphs of Q(G), without performing expensive query evaluation. Such quality-awareness makes graph exploration more controllable and reliable to end users, who use conventional KWS as in search engines, and only need to specify a simple threshold.

The systems and methods described herein also extend incremental computation to KWS with new optimality guarantees for established KWS query classes. Given a query Q, answer Q(G), and an expanded query Q', the systems and methods described herein incrementally update Q(G) to approximate answers Q'(G) with a bounded time cost. This ensures the fast response of search sessions when exploring a large G. A simple configuration panel enables users to tune the quality-aware exploration. Built-in libraries of common information retrieval metrics, KWS query classes, and query evaluation algorithms facilitate graph exploration with various query and cost models.

The high quality (low cost) answers generated using the techniques described herein lead to highly interpretable answers with strong and meaningful connections among keyword matches of a query. Since a user may validate the retrieved relevant answers, the expansion terms are highly relevant to the user's intent based on the initial query and validated answers. This leads to an interactive exploratory search session that allows a user to explore more about a (sub)set of retrieved information. Importantly, suggested queries can be answered within a bounded time cost determined by adaptable user-defined thresholds. Further diversification of the expansion terms may be implemented to cover various aspects of relevant information without exceeding the bounded time cost. Also, incremental computation of suggested queries benefits from the already explored area and highly outperforms from-scratch computation.

Figure 2:
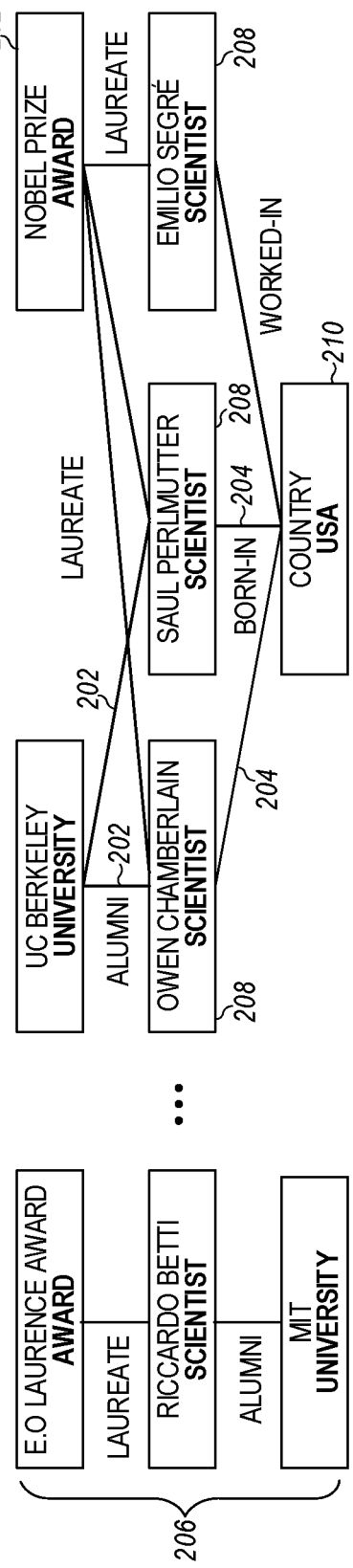
FIG. 2 illustrates a fraction of knowledge graph G taken from DBpedia for use in illustrating the systems and methods of sample embodiments.

The systems and methods described herein will be introduced by first referring to FIG. 2, which illustrates a fraction of knowledge graph G (200) taken from DBpedia (extracted from Wikipedia, represented as a heterogeneous network). Each entity in G carries multiple terms (e.g., 'USA', and 'Country' from its type). As illustrated, a user issues a distinct root-based (DR) query $Q$ with keywords chosen to be the names of two famous physicists 'Owen Chamberlain' and 'Saul Perlmutter' and validates the top-2 answers $Q(G)$ that contains trees $G_{Q_1}$ 202 (including alumni UC Berkeley University) and $G_{Q_2}$ 204 (including born-in Country USA), rooted at the entities 'UC Berkeley' and 'USA', respectively. The cost of an answer is the total distance from the root to all its leaves; the lower, the better.

It is assumed that the user wishes to explore the network data G by adding new keywords relevant to $Q$ and validated answers $Q(G)$ with hopes of gaining new knowledge. There are several options. For example, the term 'Riccardo Betti' may be suggested by query-by-example, which aims to find similar facts to the observed statement "Owen Chamberlain won Nobel Prize" as an example. The query $Q \cup \{$'Riccardo'$\}$, nevertheless, has answers with low quality, as the common ancestor for all of the three content nodes has a large distance to each in G. On the other hand, the term 'Scientist' can be suggested as a frequent term that co-occurs with observed content nodes. The query $Q \cup \{$'Scientist'$\}$ is not very informative as the selection of 'Scientist' either does not add new information since it has been already in the answers or there might be many far matches to 'Scientist' in the network that are irrelevant to the validated initial answers. It is also expensive to find best answers, due to the inspection of a large number of entities relevant to 'Scientists.' Suggestions following 'Scientist' readily terminate as no new co-occurred term in existing content nodes is found.

Such loss of answer quality can be "amplified" in future rounds of exploration. Indeed, further refinement by adding more terms following 'Riccardo Betti' leads to answers 206 containing the initial scientists (validated content nodes) with lower quality (higher cost). Suggesting "Riccardo Betti" produces high cost answers since it is not close to the validated content nodes. In networks, this leads to answers that are not well-interpretable.

Among the various options such as "Scientist", "Riccardo Betti", etc., "Emilio Segre" who also won Nobel Prize seems to be more informative. Thus, a more desirable suggestion in the above example would be a query $Q' = Q \cup \{$'Emilio Segre'$\}$, which guarantees to have an answer that includes all desirable content nodes 208. This answer also can be efficiently found as the content node 'Emilio Segre' is close to the validated $Q(G)$. Moreover, this answer adds a new path to each previous validated answer while due to the high proximity of the new match to initial answers the cost of updated answers is also low. One may "refine" $Q(G)$ directly to find $Q'(G)$ (208) suggesting Nobel Prize winners, without re-evaluating $Q'$.

Thus, if the query is to find relationships among scientists via various paths using the graph of FIG. 2, various results are possible. The results may include an award-winner scientist. Though "Riccardo Betti" at 206 would satisfy this query, the result that included initial scientists has a high answer cost that is less interpretable. A better result would identify a co-occurrence with content-nodes (e.g. 'Scientist'). However, this result would provide thousands of candidates from different areas and may not reveal new information. An even better result would use terms from other entities, close to the initial answers validated by the user. This approach would identify "Emilio Segre" as another "Nobel Prize" winner.

As noted above, the goal is to enable graph exploration with a guaranteed answer quality and time cost for established KWS query models. The need of such search paradigms is evident in knowledge exploration and "why-not" query processing and may help to identify highly-correlated queries to reverse-engineer the sensitive entity information.

Performance guarantees are added by enhancing query refinement and evaluation with guarantees on answer quality and time cost, respectively. For this purpose, the characterizations of quality-preserving query refinement and incremental answer evaluation are introduced.

Quality-Preserving Query Refinement.

Given a KWS query $Q$ and an answer $Q(G)$ that contains desirable content nodes (validated by users), the task is to refine $Q$ to a new query $Q'$ that guarantees to have a good "intermediate" answer $Q'(G)^I$ that approximates the answer $Q'(G)$ by expanding $Q(G)$, with a bounded loss of quality. In sample embodiments, the bound can be predefined or adjusted by users at each session.

The enhanced query refinement only returns promising refined queries with answers having bounded quality loss. For example, the query $Q'$ in the above example described with respect to FIG. 2 has an intermediate answer that contains $Q(G)$ and a (low cost) path induced by 'Saul Perlmutter,' 'Nobel Prize,' and 'Emilio Segre.'

Incremental Answer Evaluation.

Given a refined query $Q'$ validated by users, answer $Q(G)$, and a set of content nodes, the incremental answer evaluation algorithm computes answer $Q'(G)$ that preserves the content nodes with a bounded loss of quality, tunable by users. For example, a top-2 result of $Q'=Q\cup\{$'Emilio Segre'$\}$ in FIG. 2 that better explains all content nodes are two trees rooted at node 'USA' (210) and 'Nobel Prize' (212) that can be obtained by posing a "slight change" of $Q(G)$, without re-evaluating Q' as a new query.

A quality-aware graph exploration as described herein interleaves quality-preserving query refinement and incremental answer evaluation to progressively find desirable information in G. To characterize efficient exploration, the methods described herein capitalize on the data locality of query processing.

As used herein, the computation of query refinement (or answer refinement using the incremental answer evaluation algorithm) is bounded if there exists an algorithm that computes refined query $Q'$ (or answers $Q'(G)$) and incurs a cost determined only by the size of $Q$ and d-hop neighbors of $Q(G)$ (denoted as $\|Q(G)\|_d$) in G, with d also determined by $Q$, independent of the size of G. That is, it only explores a bounded area "around" $Q(G)$ to compute $Q'$ and $Q'(G)$.

Quality-aware KWS based graph exploratory as described herein provides desirable performance guarantees in practice by allowing users to tune the quality expectation of the answers at any stage of the search and by the computation incurring bounded cost in any round. As will be apparent to those skilled in the art from the following description, these performance guarantees ensure a "controllable" and effective exploratory method for users.

The system and method described herein provides KWS-based graph exploration with provable guarantees on answer quality and time cost by providing KWS query refinement and incremental answer evaluation as defined above.

New Characterization of Exploratory KWS

Quality-aware graph exploration using KWS is formalized with two building block problems: quality-preserving query refinement (QR) and incremental answer evaluation or answer refinement (AR). For the three established KWS query classes distinct root-based (DR), Steiner tree-based (ST), and Steiner graph-based (SG), bounded exploratory algorithms with provable quality guarantees on the answers are described below. These algorithms verify the feasibility of fast quality-aware graph exploration using existing KWS query classes. The quality-awareness of the solution leads to queries with more interpretable answers due to stronger connections between the matches of keywords in an answer set. Incremental evaluation leads to fast answers modification with respect to the new query.

KWS Query Refinement

Intermediate answers for a refined query $Q'$ are characterized as subgraphs that contain $Q(G)$ with new content nodes. The notion of δ-expansions, described in detail below, are refined queries that guarantee to have the answers with bounded quality loss determined by a ratio δ with respect to the quality of $Q(G)$. Query refinement problems are tractable for DR, ST, and SG queries. Bounded algorithms for all three classes are described below that can be readily extended to support diversified query refinement.

Incremental Answer Evaluation (Answer Refinement)

Algorithms are also described below that incrementally compute $Q'(G)$ by modifying $Q(G)$ for DR, ST, and SG queries. The improved answers $Q'(G)$, characterized by content preserving answers, pertain to all desirable content nodes but allow a refined set of intermediate nodes and edges to better explain their connections. All bounded, these algorithms find optimal content preserving answers for DR and intractable SG queries, and approximate answers for ST queries. All the answers guarantee to have bounded quality loss.

The exploratory KWS algorithms described herein are evaluated using real world graphs. It is shown that the bounded query refinement algorithms efficiently suggest queries that preserve the answer quality and that the incremental answer evaluation is efficient. The algorithms outperform standard KWS counterparts that reevaluate queries with none or little quality loss by orders of magnitude. Finally, a case study verifies that quality-aware graph exploration suggests new terms with high answer quality and can be tuned to switch between more "open" exploration (more new information with tolerance on quality loss) and more "conservative" counterparts (towards less quality loss).

Exploratory algorithms are also provided that guarantee a tunable quality of answers with bounded computational cost. Query refinement is also provided for a schema-free, multi-labeled graph, beyond relational data and XML. Incremental algorithms are also described that directly update the answers of original queries for newly suggested queries. Also, it is recognized that an incremental algorithm is bounded if it incurs a cost that is determined by the query size and certain hops of changes in graphs. Incremental computation is extended to exploratory methods and bounded algorithms are described that cope with changes in queries.

Keyword Search in Graphs

KWS will be described below with respect to schema-free graphs and the following definitions.

A labeled graph $G=(V, E)$ with node set V and a set of directed edges $E\subseteq V\times V$ is considered where each node $v\in V$ (or edge $e\in E$) has a label $L(v)$ (or $L(e)$) that carries its content as a set of terms. For example, a node v (or edge e) may represent a tuple (or a dependency) in a relational database, or an entity (or a relation) in a knowledge graph, where $L(v)$ (or $L(e)$) encodes attribute or property values, respectively. Existing models may also associate a predefined weight $w(e)$ ($w(e)>0$) to each edge $e=(u, v)\in E$ (set as 1 by default) as a measure of "cost" to connect two nodes u and v in G. A cost can be determined by, for example, semantic closeness of u and v, or edge reliability.

A keyword query $Q$ is a set of terms $\{t1, \ldots, tn\}$. Given graph $G=(V, E)$ and a term $t_i$, a match function determines a set of content nodes $V(t_i) \subseteq V$ that match $t_i$. For example, it can be a transformation that finds the nodes with labels that are synonyms of $t_i$.

A query answer $G\,Q$ is a subgraph of G that contains at least one node from $V(t_i)$ for each $t_i \in Q$. The set of content nodes in $G\,Q$ is denoted as $C(G\,Q)$. Given a function $F(G\,Q)$ that computes a "cost" of an answer $G\,Q$, and an integer k, the top-k answers of $Q$ in G are ranked by $F(\bullet)$ as $Q(G)$, and its cost $F(Q(G)) = \Sigma_{G_Q \in Q(G)} F(G\,Q)$, abusing the notion of cost function F. The function $F(\bullet)$ quantifies the cost of connecting all content nodes in G where answers with smaller cost have higher quality.

The following notations will be used below. Given a node pair (u, v) in graph G, the distance from u to v, denoted as dist(u, v), is the sum of edge weight on the shortest path from u to v. len(u, v) denotes the length of the shortest path from u to v. dist is considered to be a metric, following the convention of KWS in graphs.

The three common classes of KWS queries are considered.

Distinct Root-Based KWS (DR)

A DR query defines $G\,Q$ as a minimal rooted tree that contains a distinct root node vr, and at least a content node $v_i \in V(t_i)$ as a leaf for each $t_i \in Q$, and len(vr, $v_i$)≤r for a pre-defined hop bound r, for each leaf $v_i$. Here, $G\,Q$ is minimal if no subtree of $G\,Q$ is an answer of $Q$ in G. The function $F(G\,Q)$ is defined as $F(G\,Q) = \Sigma_{n \in Q}$ dist(vr, $v_i$), where $v_i$ ranges over the content nodes. The top-k answers of a DR query can be found in $O(|Q|(|V|\log|V|+|E|))$ time.

Steiner Tree-Based KWS (ST)

A Steiner tree-based query (ST query) differs from a DR query in that it uses a different $F(GQ)$, which is defined as $F(G\,GQ) = \Sigma_{e \in GQ} w(e)$, i.e., the total weight of the edges in the Steiner tree $G\,GQ$. Following convention, undirected Steiner trees are considered. It will be appreciated that it is NP-hard to evaluate a ST query by computing a minimum weighted Steiner tree (MST), a known NP-hard problem. Both exact and approximation algorithms have are described herein to evaluate ST queries.

Steiner Graph-Based KWS (SG)

Finding $G\,GQ$ as graphs rather than trees may be more helpful. For SG queries with a specified number r, $G\,GQ$ is a Steiner graph that contains content nodes and Steiner nodes (i.e., nodes on shortest paths between two content nodes), with either radius bounded by a number r (i.e., r-radius Steiner graph), or distance between any two content nodes bounded by r (i.e., r-clique). For an answer $G\,GQ$ with nodes $\{v1, \ldots, vn\}$, its cost $F(G\,Q)$ is computed as $\Sigma_{i \in [1,n]} \Sigma_{j \in [i+1,n]}$ dist$(v_i, v_j)$, i.e., the total pairwise distances of the content nodes in $G\,Q$. Here, the distances are typically induced by undirected shortest paths.

It is in general NP-hard to evaluate SG queries. Approximate algorithms are described herein for SG queries to find r-radius graphs and r-cliques. In this description, r-clique queries will be considered with feasible algorithms when G is large.

Figure 3B:
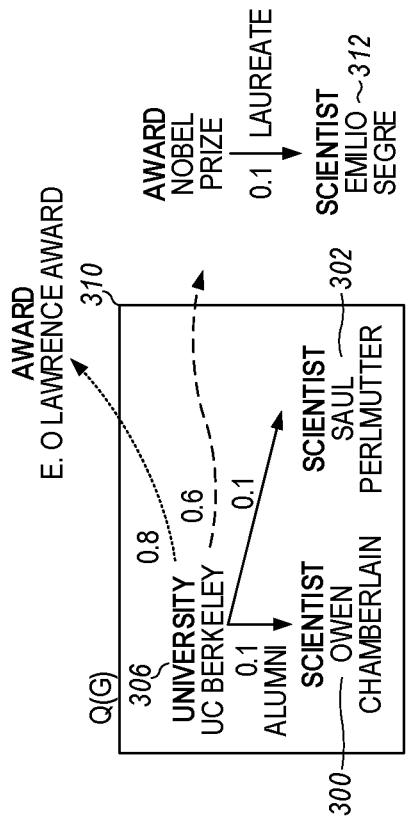
FIGS. 3A-3D collectively illustrate fractions of the knowledge graph G of FIG. 2 for use in demonstrating the general idea of quality-aware exploration in sample embodiments.
Figure 3D:
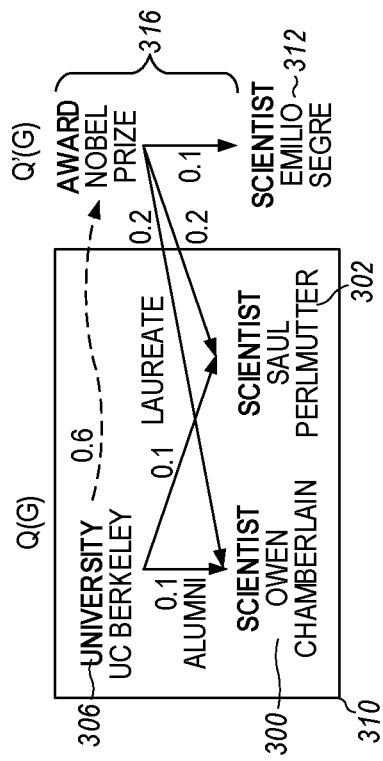
Figure 3A:
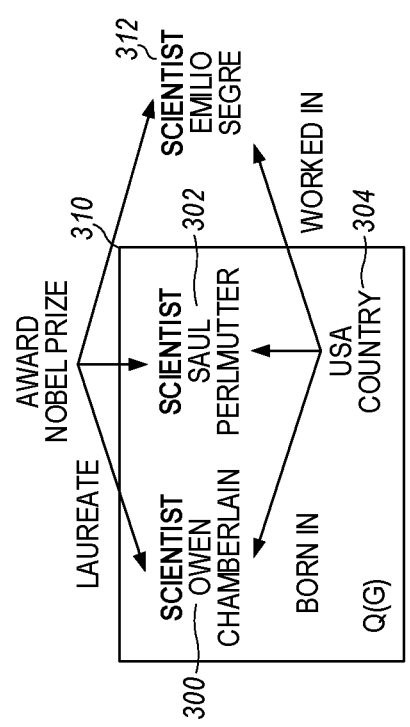
Figure 3C:
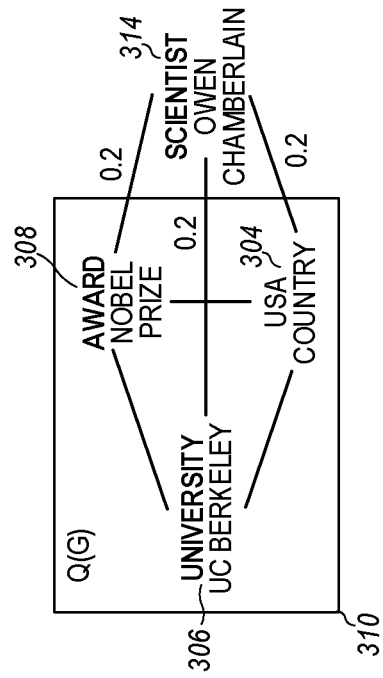

FIGS. 3A, 3B, 3C, and 3D demonstrate the general idea of quality-aware exploration in sample embodiments by illustrating a top answer $Q(G)$ for a KWS query $Q$ in different classes. For a DR query $Q1=\{$Owen, Saul$\}$ for nodes 'Owen' 300 and 'Saul' 302, $Q(G)$ is as shown in FIG. 3A as a tree rooted at USA 304, with a cost $F(Q(G))=2$. For an ST query $Q2$ with the same keywords as $Q1$, a best answer shown in FIG. 3B is a minimum weighted spanning tree rooted at node 'UC Berkeley' 306. Here, an edge weight (e.g., 0.1) can denote the "unreliability" of a fact edge in G, the smaller, the better. The cost $F(Q2(G))$ is 0.2. For query $Q3$ that contains keywords 'UC Berkeley', 'Nobel', and 'USA', $Q3(G)$ is shown in FIG. 3C with edge weights denoting the distances among content nodes (omitted) including node 'Nobel' 308.

In FIGS. 3A, 3B, 3C, and 3D, the content nodes 300-308 and the validated answers are bounded by rectangle 310. Given $Q_1(G)$ of a DR query (FIG. 3A) with cost 2, and user-defined $\delta=0.5$, the bounded cost to suggest a new term is $2(1+0.5)=3(C_p=1)$. A term 'Emilio' 312 can be suggested as a 1 hop neighbor of $Q_1(G)$, adding a cost 1 (given USA 304 as its root). For $Q_2(G)$ as a Steiner tree with cost 0.2 and $\delta=3.5$, the cost bound is $0.2(1+3.5)=0.9$. A term 'Emilio' 312 can be suggested to Q, by "appending" a path from 'UC Berkeley' 306 to 'Emilio' 312 to $Q_2(G)$. Similarly, 'Chamberlain' 314 can be suggested to extend $Q_3(G)$ as r-cliques with bounded additional cost 0.6. Larger $\delta$ allows "further" terms to be suggested.

Keyword-Based Graph Exploration

A graph exploratory may be modeled as an interactive sequence of search sessions. Each session takes as input a pair ($Q$, $Q(G)$) that contains a KWS query $Q$ and its answer $Q(G)$ (validated by users), and returns a new pair ($Q'$, $Q'(G)$) that contains a refined query $Q'$ and its answers $Q'(G)$ to be validated in the next session.

As described above with respect to FIG. 1, a session with two "building block" tasks including a quality-preserving query refinement, which refines $Q$ to $Q'$ with "intermediate" answers that have guaranteed quality, and incremental answer evaluation, which computes the answers $Q'(G)$, without reevaluating $Q'$ from scratch. At any session, users can control the quality loss of the answers with $\delta$ and suggest new content nodes $V_C$.

Quality-Preserving Query Refinement

A query Q' refines another query $Q$ if $Q'=Q \cup \{t\}(t \notin Q)$, i.e., it adds a new term to $Q$. To characterize answer qualities, an intermediate substructure is characterized with augmented answers described as follows.

Given a graph G, a keyword query $Q$, a top-k answer $Q(G)=\{G_{Q_1}, \ldots, G_{Q_k}\}$, and a refined query Q', a subgraph $Q'(G)^A$ of G is an augmented answer of Q' with respect to $Q(G)$, if (1) $Q'(G)^A$ is a top-k answer of Q' in G, in the form of $\{G_{Q'_1}, \ldots, G_{Q'_k}\}$, and (2) each answer $G_{Q'_i} \in Q'(G)$ contains $G_{Q_i} \in Q(G)$ ($i \in [1,k]$). An augmented answer $Q'(G)^A$ preserves all the information of $Q(G)$ and contains relevant nodes that suggest new terms. For a refined query Q', $Q'(G)^A$ can be returned as a valid answer or be inspected to find better answers as explained below. In both cases, it is desirable to ensure that Q' has a non-empty augmented answer $Q'(G)^A$ and that $Q(G)^A$ has a quality that does not "degrade" too much from that of $Q(G)$. This can be characterized by a notion of $\delta$-expansion, which will be explained in more detail below.

Given a KWS query class Q, queries $Q$ and Q' in Q, graph G, and answers $Q(G)$, a refined query Q' of $Q$ is a $\delta$-expansion of $Q$ in G if there exists a non-empty set of augmented answers $Q'(G)^A$ of Q' with respect to $Q(G)$, such that all the content nodes in the answer set $Q(G)$ are contained in $Q'(G)$ and $(F(Q'(G)))/(F(Q(G))) \leq 1+\delta$. Here F is the bounded answers cost function for Q where validated content nodes are preserved.

By intuition, δ-expansions refer to queries that have non-empty answers, where the answers preserve validated content nodes from $Q(G)$ in the last session, and the answers have a bounded answer cost no more than $(1+δ)F(Q(G))$. Given Q and user-defined δ, the exploratory system suggests a set of δ-expansions $Q'$ without enumerating and evaluating KWS queries using the key enabling technique called answer augmentation described in detail below.

A δ-expansion ensures to have augmented answers with a bounded (user-defined) cost with respect to $Q(G)$, tunable by users. Queries with no answers that have a bounded cost required by users are often not desirable. Consider the following query refinement problem.

For a KWS query class Q and a query $Q \in \mathbf{Q}$, the quality-preserving query refinement problem (QR) for $Q$ is stated as follows:
Input: Graph G, query Q, exploration range r, a cost threshold δ, validated answers Q(G);
Output: a top-n diversified set $Q_R$ of all δ-expansions of Q in G.

As noted above, a feasible query refinement algorithm should avoid expensive query evaluation but only explore a relevant fraction of G with time cost determined by $Q$ and a bounded hop of neighbors of $Q(G)$ only. Bounded algorithms for query refinement for each query class DR, ST, and SG will be provided below.

It is noted that existing graph exploration typically constructs "intermediate" substructures that extend Q(G), characterized as the relevant neighborhood in a query by example, approximate results, or augmented summaries. The notions of δ-expansion and augmented answers described herein can be readily adapted to these structures to suggest diversified queries that provide answers with guaranteed quality.

Incremental Answer Evaluation (Answer Refinement)

Given a δ-expansion Q' suggested by query refinement task, one can already inspect augmented answer $Q^A(G)$ as a valid answer with bounded cost. Nevertheless, these answers always contain an entire $Q(G)$ and can be too restrictive to provide novel information in graph exploration. A better role $Q^A(G)$ plays is to serve as intermediate structures that suggest new content nodes. Along with $Q(G)$, these content nodes induce better answers Q'(G) for Q'. Moreover, users may also want to suggest what their own content nodes Q'(G) should contain (e.g., a "why-not" query that enforce new entities not in $Q(G)$). Content preserving answers are characterized below.

Given a query $Q' = Q \cup \{t\}$ ($t \notin Q$), answer $Q(G) = \{G_{Q_1}, \ldots, G_{Q_k}\}$, a number δ, and a set of content nodes $V_C \subseteq V(t)$ of t, a δ-content preserving answer $Q'(G)$ is a set of subgraphs $\{G_{Q'_1}, \ldots, G_{Q'_k}\}$ of G, such that each $G_{Q'_i} \in Q'(G)$ is an answer to Q', and contains all the content nodes of $G_{Q_i}$, and at least one node in $V_C(i \in [1,k])$ and $F(Q'(G)) \leq (1+δ)F(Q(G))$. A content preserving answer Q'(G) preserves the validated content nodes in $Q(G)$, contains at least some "new" content nodes from $V_C$, and connects these content nodes at a bounded answer cost tunable by setting parameter δ.

For a KWS query class Q, the incremental answer evaluation or answer refinement problem (AR) for Q is stated as follows:
Input: Graph G, content nodes $V_C$, a refined query Q', answer Q(G);
Output: an optimal δ-content preserving answer Q'(G) that minimizes F(Q'(G)).

A straightforward method is to reevaluate Q' as a new query and to enumerate all its answers to find the best one. This is clearly expensive even for tractable DR queries in large G, leaving alone intractable ST and SG queries. This can be improved by developing incremental algorithms that directly update $Q(G)$ to a content preserving answer for a given set of content nodes $V_C$. Such algorithms for DR, ST, and SG are provided below.

As used herein, the two parameters δ and $V_C$ characterize the "freedom" of including new contents in graph exploration. Larger δ allows more terms to be considered for query suggestion. When δ=0, no new term is allowed. Larger $V_C$ allows more candidate content-preserving answers to be considered for incremental answer evaluation. When $V_C$=0, any δ-expansion Q' from query refinement already guarantees the existence of δ-content preserving answers, which are its augmented answers. Existing exploratory methods do not provide such control for users.

Quality-Preserving Query Refinement

Query refinement will be described for three common KWS query classes: DR, ST, and SG. As will be explained, query refinement is tractable for all three classes. In other words, for each query class, there exists a bounded algorithm that computes all δ-expansions for a given query in the class and quality-preserving query refinement is feasible even for intractable ST and SG queries. Bounded query refinement algorithms will now be described.

Bounded Query Refinement

The following algorithm computes optimal $Q^A(G)$. For each answer $G_{Q_i} \in Q(G)$, the algorithm executes two steps as follows. First, the algorithm initializes a set of source nodes $V_{Si}$ in $G_{Q_i}$. For DR, $V_{Si}$ is the root of $G_{Q_i}$. For ST and SG, $V_{S_i}$ refers to its node set. Second, for each content node $v \in V(t)$, the algorithm performs a bounded single source shortest path (SSSP) procedure $SSSP(v_j, d)$ that extends, for example, a Dijkstra algorithm from each node $v_j$ in $V_{S_i}$ to compute $dist(v_j, v)$, and decides a new answer cost $F^A(G_{Q_i}, v)$, up to d hops of $v_j$ determined by $Q$. For DR and SG, $F^A(G_{Q_i}, v) = F(Q(G)) + \min v_j \in V_{S_i} \, dist(v_j, v)$, and d is determined by the hop bound and distance bound r in DR and SG, respectively. For ST, the hop bound d=r, and $F^A(G_{Q_i}, v) = F(Q(G)) + \min vj \in V_{S_i} \, dist(v_j, v)$. The algorithm then computes the cost of an optimal augmented answer of $Q' = Q \cup \{t\}$ as $\min_{v \in V(t)} F^A(G_{Q_i}, v)$.

The procedure extends $Q(G)$ with the "closest" content nodes of t. By "appending" shortest paths from specified source nodes to v, an optimal augmented answer of Q' can be constructed. It can be verified that no other augmented answer for the same term t has a smaller answer cost. As $V_t \subseteq V$, it takes $|V|*(|V|\log|V|+|E|)$ time.

A straightforward solution invokes the above algorithm to verify all possible refined queries. It suffices to test whether their optimal augmented answers have bounded answer cost. If so, the queries are δ-expansions. Nevertheless, this requires O(|V|) rounds of SSSP, which is expensive.

The general idea behind bounded algorithms is to "reverse engineer" a KWS process. The query expansion (refinement) first identifies relevant nodes that match a term within a bounded hop of neighbors of each initial and validated answer by locally exploring a bounded hop of neighbors of $Q(G)$ and directly constructing refined queries and their optimal augmented answers without expensive query evaluation. Reverse engineering a KWS process generally includes finding nearby nodes that match a term t within a bounded hop of neighbors to all validated answers $G_Q \in Q(G)$ and inserting shortest paths connecting each initial answer to connect these answer nodes to the nearest node in the answer $G_Q$ containing t that induces a δ-expansion. This dynamically induces a subgraph "augmented" from the initial answer that serves as a valid answer for Q' and induces a query expansion Q' by adding the term t. It then induces a query expansion Q' by adding the term. The newly augmented answer serves as a valid answer for Q' with bounded answer cost already computed by the augmented path.

The following is a general algorithm for all three query classes DR, ST and SG where the valid answer for Q' has a bounded answer cost.

Given query $Q$ and top-k answer $Q(G)$, the bounded algorithm computes $Q_R$, the set of all δ-expansions of $Q$, by executing at most k rounds of bounded traversal. Each traversal starts from a set of source nodes $V_{S_i}$ in $GQ$ and visits up to a bounded hop of their neighbors with bounded SSSP, one for each source node. More specifically:

(1) For an SSSP at $GQi$ and each term t in a node v it visits, the algorithm computes the additional cost if $GQi$ is extended to an augmented answer of query $Q' = Q \cup \{t\}$, by "appending" shortest paths from the source node $V_{Si}$ to v.
(2) When all SSSPs are completed, for each new term t, the algorithm computes the total additional cost ŵ introduced by extending $Q(G)$ to an augmented answer of query $Q'$. If ŵ is larger than a threshold $C_p$ (set as δ*F($Q(G)$) by default), the algorithm prunes query $Q \cup \{t\}$. Otherwise, the algorithm adds $Q' = Q \cup \{t\}$ to the set $Q_R$ of all δ-expansions of $Q$.

For query class Q and a query $Q \in Q$, the algorithm should guarantee two invariants: (I1): All δ-expansion of $Q$ is included in QR; and (I2): Any query $Q \cup \{k\}$ that is not δ-expansion is pruned by testing ŵ≤$C_p$. Specific algorithms for each query class Q that guarantee both invariants for any query instance $Q \in Q$ are described below.

The algorithms for each query class Q visit up to a bounded hop d of the source nodes $V_S$ in $Q(G)$, which is further bounded by $\|Q(G)\|_d$. The total time cost of each specialized algorithm is bounded by a polynomial function of $|Q|$ and $\|Q(G)\|_d$ and specify d for each query class.

FIG. 3A demonstrates the general idea of QR algorithms given $Q1(G)$. With cost 2 and δ=0.5, the bounded cost to suggest a keyword is 2*1.5=3. A term 'Emilio' can be suggested as a 1 hop neighbor of a validated node 'USA' 304 in $Q(G)$, adding a cost 1 to $Q(G)$ (310). For larger δ, terms that are "further away" from 'USA' 304 can be suggested. For $Q2(G)$ with cost 0.2 and δ=3.5, the cost that an augmented answer can have is 0.2 (1+3.5)=0.9. A term 'Emilio' can be suggested to $Q$ to form an augmented answer by "appending" a path from 'UC Berkeley' 306 to 'Emilio' 312 to $Q(G)$ 310 as shown in FIG. 3B. Similarly, 'Owen' can be suggested to extend $Q(G)$ as r-cliques with bounded additional cost 0.6, as shown in FIG. 3C.

The following are the common operators used by each of the specific algorithms.

Bounded SSSP: All the algorithms use the bounded SSSP procedure, controlled by two structures. First, a priority queue L in an SSSP iterator records node information and creates new refined queries to be verified. Each element L. v of L is a triple (v, len(v, s), dist(v, s)), where len(v, s) (or dist(v, s)) denotes the current length of a traversed path (or accumulated distance) from a source node s to node v via SSSP. An operation SSSP.next( ) returns the next node v closest to v (with the smallest dist(v, s)). The bounded SSSP terminates when len(v, s)>d or dist(v, s)>$C_p$, given hop bound d and threshold $C_p$. Second, a keyword-cost map C records the additional cost introduced by new terms to extend $Q(G)$. An entry C[k][i] denotes the cost to be added to $F(G(Q))$ if the i-th answer G $Q_i \in Q(G)$ is extended by adding a content node of keyword k.

Operator Validate: The operator Validate (shown below), decides whether a term t contributes to a δ-expansion. It reads the information of a newly visited node v from L in the last SSSP. It then computes the total cost ŵ, verifies if $Q' = Q \cup \{t\}$ is a δ-expansion and updates $Q_R$.

| Operator Validate (Q, v, $C_p$, C, $Q_R$) |
|---|
| Input: query Q, node v, threshold $C_p$, map C, set $Q_R$. |
| Output: updated $Q_R$. |
| /* find refined queries in the last round of SSSP */ |
| 1.    for each term t ∈ L(v) do |
| 2.    $$\hat{w} := \sum_{j=1}^{k} C[t][j];$$ |
| /* aggregate total cost to refine Q(G) */ |
| 3.    if ŵ ≤ $C_p$ then |
| 4.        Q' := Q ∪ {t}; $Q_R$ := $Q_R$ ∪ {Q'}; |
| 5.    return $Q_R$; |

Operator Update: The operator Update (shown below) maintains the cost map C. It checks if v has already exceeded $C_p$ and returns C with no change (line 1). Otherwise, for each term t contained in node v (line 2), it updates C (line 3) with the smaller one of C[t][i] and accumulated distances L[v].c.

| Operator Update ($\mathcal{L}$(v), i, $C_p$, C) |
|---|
| Input: queue entry ($\mathcal{L}$(v), iterator i, threshold $C_p$, map C. |
| Output: updated map C. |
| 1.    if $\mathcal{L}$(v). c > $C_p$ then return C; |
| 2.    for each term t ∈ L(v) do |
|         /* estimate cost to refine $G_{Q_i}$ */ |
| 3.        C[t][i] := min(C[t][i], $\mathcal{L}$(v). c); |
| 4.    return C; |

The general algorithm with these operators for each query class DR, ST and SG, will be respectively described in the following sections.

Refining DR Queries

The algorithm for DR will be denoted as QR-DR.

Algorithm $Q$R-DR

Given $Q(G)$ as k distinct rooted trees, the algorithm QR-DR (illustrated below) follows the general algorithm described above, but with a simple specification: the source $V_{S_i}$ of the i-th traversal for each G $Q_i$ consists of the single root ri of G $Q_i$ (line 3). The optimal augmented answer of $Q' = Q \cup \{t\}$ for each G $Qi$ is constructed by appending a shortest path from its root $r_i$ to a closest content node of t.

| Algorithm QR-DR |
|---|
| Input: graph G, bound δ, a DR query Q, top-k answer Q(G); |
| Output: δ-extensions $Q_R$ of Q. |
| 1.    set $Q_R$:=∅; map C := ∅; threshold Cp := δ * F(Q(G)); |
|     /* k rounds of bounded SSSP */ |
| 2.    for iterator i =1 to k do |
| 3.        Create iterator $SSSP_i$ originated from $r_i$ bounded by r & $C_p$; |
| 4.        while ($SSSP_i$.next( ) ≠ ∅) do |
| 5.            $\mathcal{L}$(v) := $SSSP_i$.next( ); |
| 6.            C := Update ($\mathcal{L}$(v), i, $C_p$, C); |

Algorithm QR-DR

```
7.      if i = k then
8.          Q_R := Validate (Q, v, C_p, C, Q_R);
9.      return Q_R;
```

Algorithm QR-DR executes k rounds of SSSP, where each round visits up to $\|Q(G)\|r$ nodes and edges in $O(\|Q(G)\|r \log \|Q(G)\|r + \|Q(G)\|r)$ time. As each node carries a small constant number of terms, time cost of Update is in $O(1)$. The total time cost of Validate is thus in $O(k)$. Hence, QR-DR takes $O(k(\|Q(G)\|r \log \|Q(G)\|r + \|Q(G)\|r))$ time. This verifies that QR-DR is bounded.

Refining ST Queries

The algorithm for to refine ST queries will be denoted as QR-ST. The goal is to find queries with augmented answers with respect to $Q(G)$ as minimum weighted Steiner trees.

Algorithm QR-ST

The algorithm QR-ST instantiates the general algorithm as in its counterpart for DR queries. The only difference is that it sets the source $V_{S_i}$ as the entire node set V $Q_i$ of G $Q_i$ for the i-th traversal. For each G $Q_i \in Q(G)$, it executes $|V Q_i|$ rounds of bounded SSSP originated from each node $v \in V Q_i$, up to r hop neighbors of v. For a specific term t, the cost C[t][i] is updated as the smallest distance from a content node vt of t to a node in V $Q_i$, which is guaranteed to be discovered by a bounded SSSP.

As an example, recall the answer $Q2(G)$ in FIG. 3B. The refined answer of query $Q'_2 = Q_2 \cup$ 'Emilio' provides a cost 0.9, which is bounded when δ=3.5. On the other hand, a keyword 'Lawrence' incurs a cost 0.8 that is already above the threshold $C_p=3.5*0.2=0.7$. Hence, QR-ST stops the exploration beyond 'Lawrence.'

The algorithm QR-DR takes $O(|Q(G)|)$ rounds of bounded SSSP in total $O((|Q(G)|+k)(\|Q(G)\|r \log \|Q(G)\|r + \|Q(G)\|r))$ time, with the factor $O(k)$ in the last round of traversal due to procedure Validate. This verifies the boundedness of QR-ST.

Refining SG Queries

The algorithm QR-SG finds δ-expansions for intractable SG queries that compute top-k r-cliques. The answer $Q(G)$ is k sets of content nodes, where each set $GQ_i$ denotes an r-clique of size $|Q|$. The goal is to find queries with augmented answers with respect to $Q(G)$ that remains to be a set of r-cliques with bounded answer cost. The algorithm QR-SG instantiates the general procedure by setting the source Vs as the node set of each r-clique, and a revised SSSP process bounded by r and Cp.

Algorithm QR-SG.

To cope with the distance constraint by SG queries, QR-SG (illustrated below) uses an additional map $C_v$ to keep track of the distances from a visited node v to the content nodes in $Q(G)$. Each entry $C_v[i][j][v]$ denotes the distance from a node v to the j-th content node (of a keyword $tj \in Q$) in the i-th answer G $Q_i \in Q(G)$.

The rest of QR-SG follows the general procedure (as illustrated in the algorithm below). It executes at most k rounds of traversal, one for each answer in $Q(G)$ (line 3). Each traversal for an answer G $Q_i$ consists of $|Q|$ bounded SSSP, one for each content node $v_{ij} \in G Q_i$ (line 4). During the exploration, the distances in $C_v$ are updated (line 8) for each visited node v and accumulated to compute the total cost σ if v is added to G $Q_i$ (line 11). The values σ are sent to the Operator Update algorithm (entry L(v)) and aggregated to decide a total cost. The δ-expansions $Q_R$ are returned when all k traversals are complete.

Algorithm QR-SG

```
Input: Graph G, bound δ, an SG query Q,
       top-k answers Q(G), bound r.
Output: δ-extensions Q_R.
    1.  map C:=Ø; map C_v := Ø; set Q_R := Ø; threshold C_p := δ *
        F(Q(G));
    2.  /* bounded SSSP from each content node of top-k answers */
    3.  for i := 1 to k do
    4.      for j :=1 to |Q| do
    5.          Create iterator SSSP_ij originated from v_ij bounded
                by r & C_p;
    6.          while (SSSP_ij.next ( ) ≠Ø) do
    7.              L(v):=SSSP_ij.next ( );
    8.              C_v[i][j][v] := min(C_v[i][j][v], L(v). c);
    9.              /* Last SSSP for a single answer */
    10.             if j = |Q| then
    11.                 σ:= Σ_{m=1}^{|Q|} C_v[i][m][v]; L(v). c := σ;
    12.                 if σ≤ C_p then
    13.                     C := Update(L(v), i, C_p, C);
    14.                     if i = k then
    15.                         Q_R := Validate(Q, v, C_p, C, Q_R);
    16. return Q_R;
```

QR-SG executes $k|Q|$ bounded SSSP. To see the boundedness, the distance bound r is mapped to its hop counterpart. The minimum (positive) weight of the edges in G is denoted as $w_m$ (which is a fixed constant for given G). Thus, any SSSP visits up to r' hop neighbors of $Q(G)$, where $r'=\lceil r/w_m \rceil$, determined by Q. As $|Q(G)| \leq k|Q|$, the total time cost is thus in $O(k|Q|(\|Q(G)\|_{r'} \log \|Q(G)\|_{r'} + \|Q(G)\|_{r'}))$. This verifies the boundedness of QR-SG.

Thus, quality-preserving query refinement is bounded for DR, ST and SG queries with the expansion time costs summarized in the table below.

| Performance of δ-expansion Discovery | |
| --- | --- |
| KWS query classes | Expansion Time Cost |
| Distinct-rooted trees | $O(\|Q(G)\|r \log\|Q(G)\|r + \|Q(G)\|r)$ |
| Steiner trees | $O((\|Q(G)\| + k) (\|Q(G)\|r \log\|Q(G)\|r + \|Q(G)\|r))$ |
| Subgraphs (r-cliques) | $O(k\|Q\|(\|Q(G)\|r \log\|Q(G)\|r + \|Q(G)\|r))$ |

The algorithms QR-DR, QR-ST, and QR-SG can be readily extended to return a set of new content nodes $V_C$ along with refined queries. These content nodes are a nice "by-product" and are useful for finding better answers of $Q'$ that improve augmented answers, as explained below.

Diversified Query Refinement

A practical expansion of QR is to suggest diversified queries with relevance measures in information retrieval. Given a set of δ-expansions QR, a bi-criteria diversification function R is defined by a relevance and a difference measure as $R(QR)=(|QR|-1)I(QR)+(2\lambda)D(QR)$, where the relevance function $I(Q_R) = \Sigma_{Q' \in Q_R} I(Q')$ measures the total relevance of QR, and the difference function $D(Q_R) = \Sigma_{Q'_i Q'_j \in Q_R} \text{diff}(Q'_i, Q'_j)$ quantifies the pairwise difference between two δ-expansions $Q'_i$ and $Q'_j$, determined by a dissimilarity measure diff, and λ is a parameter to trade off relevancy with diversity of set QR.

The problem of diversified QR is to find top-n diversified δ-expansions $Q_R$ that maximizes $R(Q_R)$. Diversified QR is, not surprisingly, NP-hard. A closer look at commonly used functions for query refinement, on the other hand, suggests bounded approximation algorithms in practice. For example, a built-in metric library may be used to support a number of commonly used relevance and dissimilarity measures for KWS and graph search such as term frequency-inverse document frequency (TF-IDF) or importance as the average degree of content nodes of t'. The difference diff(•) can be defined as Jaccard distance among relevant labels.

The result below shows quality-preserving query refinement is "compatible" with the mentioned IR metrics.

Diversification Algorithm

A greedy algorithm, denoted as DivQR, for diversified QR is defined with max-sum diversification function R. Given a query Q as a DR, ST, or SG query, it invokes algorithm QR-DR, QR-ST and QR-SG, respectively, to find the set $Q_R$ of all δ-expansions. It then adopts a greedy selection strategy to add pairs of refined queries to a set $Q'_R$ that maximizes the revised function $R'(Q_R)$ that rounds R as $\Sigma_{QiQj \in QR} D'(Q_i, Q_j)$, where D'(•,•) is defined as I($Q$i)+I($Q$j)+(2*λ)diff($Q$i, $Q$j). The process repeats until n δ-expansions are found. The set is returned as top-n diversified refined queries.

The above greedy strategy produces top-n diversified δ-expansions with approximation ratio 2. In addition, it simulates a 2-approximation for the facility dispersion problem described further below.

Finding top-n diversified δ-expansions Q' is NP-hard. Given functions I(•) and D(•) defined by any of the above metrics, and a pool of queries obtained from answer augmentation, the system described herein computes diversified Q' with a 2-approximation by solving a max-sum diversification problem.

The objective function R defined above is to maximize the sum of the relevance I(•) and dissimilarity D(•) of the selected set $QR$. The max-sum diversification function R can be transformed to a facility dispersion objective denoted as MaxSumDispersion problem. The objective function of MaxSumDispersion aims to maximize the sum of all pairwise distances between points in the selected set that can be shown to be equivalent to R by defining a new distance function D'($Q$i, $Q$j)=I($Q$i) I($Q$j)+(2*λ)diff($Q$i, $Q$j). Then, given n to select top-n relevant and diversified queries from the set of all δ-expansions $QR$ ( $QR \subset QR$, | $QR$|=n), then:

$$\sum_{Q_i, Q_j \in Q_R} D'(Q_i, Q_j) = (|Q_R| - 1) \sum_{Q_i \in Q_R} I(Q_i) + 2\lambda \sum_{Q_i, Q_j \in Q_R} D(Q_i, Q_j) \quad (1)$$

By leveraging the definition of D'(•,•) and the fact that each I($Q$i) is exactly considered | $Q$R|−1 times in the sum, then:

$$f(Q_R) = \sum_{Q_i, Q_j \in Q_R} D'(Q_i, Q_j)$$

where f($Q$R) is the objective function of MaxSumDispersion and D(•,•) is a metric.

Given this reduction, the well-known solutions provided for MaxSumDispersion can be leveraged to guarantee 2-approximation.

Top-n relevant and diversified queries may be selected from $Q$R using known result diversification algorithms. The algorithm DivQR (illustrated below) constructs a weighted complete graph GR=(VR, ER) as follows. 1) VR= $Q$i where $Q$i ∈ $Q$R and the edge weight of each pair ( $Q$i, $Q$j)∈ER is assigned by computing D'( $Q$i, $Q$j). Iteratively, it selects two $Q\bar{i}$, $Q\bar{j}$ that has maximum dist($Q\bar{i}$,$Q\bar{j}$) among all queries (Line 3). Two queries are added to the set of $Q$R (Line 4) and the incident edges to them are removed from ER (Line 5). Finally, if n is odd, DivQR adds one arbitrary not already selected query $Q$to $Q$R (Line 6).

---

Algorithm DivQR

Input: weighted complete graph $G_R$, set $Q_R$, integer n
Output: top-n diversified δ-extensions $Q_R$ that maximizes $R(Q_R)$.
1.  $Q_R := \emptyset$
2.  for $i := 1$ to $\lfloor \frac{n}{2} \rfloor$ do
3.  $\langle Q_i, Q_j \rangle := \arg \max_{Q_m, Q_n \in QR} \text{dist}(Q_m, Q_n)$;
4.  $Q_R := Q_R \cup \{Q_i, Q_j\}$;
5.  Delete edges from $E_R$ that are incident to $Q_i$ or $Q_j$;
6.  if n is odd, add an arbitrary Q from $Q_R$ to $Q_R$;
7.  return $Q_R$;

---

Bounded Answer Refinement (Incremental Answer Evaluation)

Bounded algorithms for the answer refinement (incremental answer evaluation) problem will now be defined for each query class. The hardness of answer refinement (AR) for ST follows from its special case when $Q$(G) is ∅. That is, AR is to compute the minimum weighted Steiner trees from scratch, given any k nodes in $V_C$ as terminal nodes, which is already NP-hard. Bounded exact and approximate answer refinement algorithms may be established for the three query classes. Pairing with their query refinement counterparts, these algorithms close the loop of a session of quality-aware graph exploration.

Answer Refinement for DR

As DR queries are tractable, one can apply a standard KWS algorithm to re-evaluate a refined answer and select the best content preserving answers. This is clearly expensive over large G. A bounded algorithm, denoted as AR-DR, for AR over DR queries is thus developed. The idea is to capitalize on the data locality of content preserving answers to incrementally update $Q$(G) by visiting up to r hops of its content nodes to find possible roots, and to dynamically verify the content answers induced by "bridging" each root to the closest node in $V_c$ up to its r hop.

The algorithm AR-DR is illustrated below. For each answer $G_{Q\bar{i}} \in Q$(G), it maintains a set $R_i$ for each answer $G_{Q\bar{i}} \in Q$(G), which stores the nodes that can be the root of a content preserving answer.

For each content node vc in VCi (content node set of $G_{Q\bar{i}}$), it performs backward best-first search (BFS) to find all the nodes V (vc, r) that can reach c within r hops (line 4-5). It then iteratively refines Ri with V (vc, r) to $\cap_{c \in vci} V(vc, r)$, as c ranges over $VC_i$ (line 6). Each node in Ri can reach all content nodes in r hop, thus is a potential root of new answers.

For each root candidate vs ∈ Ri, it invokes a procedure SSSP ($v_s$, r, $V_C$), which finds the closest node $v_{sC}$ in $V_C$ that vs can reach in an r-hop (line 8). An optimal content preserving answer $G_{Q'i}$ is the tree induced by $VC_i$, root $v_s^*$ and the closest content node $v_{sc}^* \in VC$ that minimizes F ($G_{Q'i}$) for DR (line 9). AR-DR constructs $Q$'(G) with k such optimal answers and returns $Q$'(G) if F( $Q$'(G)) has a bounded quality loss (line 13). Otherwise, it early terminates without further exploration (line 12).

Algorithm AR-DR

Input: graph G, $V_C$, top-k answer Q(G), bound δ and r;
Output: optimal content-preserving answers Q'(G).
1.   initialize answer Q'(G) := ∅;
2.   for each answer $G_{Qi} \in Q(G)$ do
3.      $R_i$ := ∅ /* initializes potential roots */
4.      for each node $v_c \in V_{C_i}$ do /* find potential root */
5.         set $V(v_c, r)$ via r-bounded backward BFS;
6.         if $R_i$ = ∅ then $R_i$ := V(c, r); else $R_i$ := $R_i \cap$ V (c, r);
        /* construct optimal content preserving answer */
7.      for each root $v_s \in R_i$ do
8.         $v_{s_c}$ := SSSP $(v_s, r, V_C)$;
9.         compute $v_s^*$ = arg min $F(v_s)$; where $$F(v_s) = \sum_{v_c \in V_{C_i}} \genfrac{}{}{0pt}{}{v_s \in R_i}{dist} (v_s, v_c) + dist\ (v_s, v_{s_c});$$

10.     construct answer $G_{Q_i'}$ with $V_{C_i}$, $v_s^*$ and $v_{s_c}^*$;
11.     Q'(G) := Q'(G) ∪ $\{G_{Q_i'}\}$;
12.     if F(Q'(G)) > (1 + δ)F(Q(G)) then return ∅;
13.  return Q'(G);

Both the procedures Backward BFS and SSSP have efficient implementation following standard KWS for DR. AR-DR consists of backward search and bounded SSSP procedures. The detailed procedures are provided below.

Backward Search

The idea of the backward search has been proposed to address the KWS problem for ST queries. Given each node $v \in V(t_i)$, i.e., node v is a content node relevant to the keyword $t_i$, a backward search strategy creates an SSSP iterator originated at v. It then performs an iterative traversal along the incoming edges of the visited nodes until finding the answer root connecting the content nodes. A best first strategy is used to select the next node to be visited by considering the distance of the next node from its origin. Later, a bidirectional search strategy is allowed to explore the graph by following forward edges and prioritizing nodes heuristically. Intuitively, it estimates how likely nodes can be answer roots.

Two strategies have been used in the backward search, namely, equidistance among the nodes of a class $V(t_i)$ and distance-balanced expansion across different keywords. It has been shown that while equidistance where nodes are visited in the order of increasing distance from their origin is optimal, the distance balanced expansion across different keywords is not. Quality-balanced expansion has been proposed as a more efficient way, where the algorithm attempts to balance the number of traversed nodes (len(•)) for each keyword. The keyword $t_i$ may be picked in a round-robin fashion where i∈[1, |Q|], and then for the selected class $V(t_i)$ the algorithm selects the closest node to its origin. Given a rich background on the backward search, the optimization of these algorithms is used in the procedures for AR-DR.

Bounded SSSP & Early Termination

Since the weight of the edges on the graph is positive, the distance of the next node returned by an SSSP iterator is monotonically non-decreasing. Thus, a bounded SSSP can be implemented by leveraging either number of hops and/or the distance from its origin node s. As soon as the next node v retrieved iterator exceeds the bounds for dist(s, v) or len(s, v), the SSSP can be terminated. In fact, the next( ) implementation does not return a node that exceeds the hop-bound (len(•)) since such a node has not been added to the priority queue at all, due to the hop-bound condition.

The Dijkstra algorithm (DA) is a well-established SSSP algorithm for weighted graphs. At each iteration, the DA extracts the vertex v∈L with the minimal dist(s, v) where s is the source node. By using induction as a proof, it can be shown that DA maintains an invariant such that whenever v is chosen from L then the discovered distance dist(s, v) by DA is the actual shortest distance. On the other hand, DA also maintains a set S of visited nodes, denoted as a "closed" set which is populated by the nodes retrieved from L. With a small modification, DA can be used to find the shortest path from a single source node s to a set of target nodes such that once S includes all the target nodes, the algorithm can early terminate.

In the AR-DR procedure, SSSP aims to discover the closest node $v_{sC}$ in $V_C$ that $v_s$ can reach in r-hops. Thus, it can early terminate as soon as SSSP picks a node $v \in V_C$ from L. Due to an invariant of DA, any other node that is being visited in the future has a distance not smaller than dist(s, v); otherwise, it would have been picked from the queue earlier.

To see that AR-DR is bounded, it can be verified that it invokes at most | Q(G)| rounds of backward BFS up to r hop of Q(G), and it invokes ‖Q(G)‖$_r$ rounds of SSSP up to r hops of $Q(G)_r$ (r-hop neighbors of Q(G)). The total cost is thus bounded by O(‖Q(G)‖$_r$ log ‖Q(G)‖$_r$+‖Q(G)‖$_{2,r}$). That is, the algorithm AR-DR is bounded.

Answer Refinement for ST

Bounded approximation algorithms are provided for AR and ST queries, without expensive query re-evaluation. The idea is to use a "divide-and-conquer" strategy that decomposes the instance of answer refinement to a set of sub-instances, which can be further approximated by bounded algorithms, and assembles local optimal answers to a global content preserving answer with a desirable quality guarantee.

Given Q(G), $V_C$, and graph G, the algorithm, denoted as AR-ST, has the following steps:

(1) It constructs (at most) k*|$V_C$| instances. Each instance $I_{ij}$ is a pair $(GQi, v_j)$ (i∈[1,k],j∈[1,|$V_C$|]), for an answer $GQ_i \in Q(G)$ and a content node $v_j \in V_C$ not in $GQ_i$.

For each instance, it invokes a procedure ReOPT to incrementally compute an optimal content preserving answer Tij (a minimum weighted Steiner tree (MST)) that contains all content nodes of $GQ_i$ and $v_j$ as a new content node.

The above step repeats and produces a set of |$V_C$| content preserving answers (denoted as $\in_i$) for each specified G Qi and all $v_j$ that ranges over $V_C$. The algorithm AR-ST then constructs Q'(G)={$T_1, \ldots, T_k$}, where $T_i$=arg min$_{Tij \in_i}$F($T_{ij}$). It returns Q'(G) if F( Q'(G))≤(1+δ)(F( Q(G))). Here F( Q'(G))=$\Sigma_{Tij \in Q'(G)}$F(Tiji).

To understand the performance guarantees of AR-ST, it is recognized that algorithm AR-ST is an ∈-approximation for AR and ST queries if procedure ReOPT is an ∈-approximation for each instance $I_{ij}$. As proof, assume the procedure ReOPT guarantees to find an ∈-approximate answer $T_{ij}$ of the optimal one $T_{ij}^*$ for instance $I_{ij}$, i.e., F($T_{ij}$)/∈≤F($T_{ij}^*$). The optimal content preserving answer Q'*(G)={$T_1^*, \ldots, T_k^*$} must contain each $T_i^*$ as the optimal answer that minimizes F(•) among all its peers for instances $I_{ij}$(j∈[1, |$V_C$|]). Thus, (F(Q'(G)))/(F(Q'*(G)))≤($\Sigma_{Ti \in Q'(G)}$F($T_i$))/ ($\Sigma_{i \in [1,k]}$ F($T_1'$)/∈), where $T_i'$ is the approximate answer of $T_i^*$. As $\Sigma_{Ti \in Q'(G)}$ F($T_i$)≤$\Sigma_{i \in [1,k]}$ F($T_1'$), (F(Q'(G)))/(F(Q'*(G)))≤∈. Thus, AR-ST is an ∈-approximation for AR.

The details of procedure ReOPT will now be described.

Procedure ReOPT

Given G $Q_i$ with node set V $Q_i$, the procedure ReOPT first performs a backward best-first search (BFS) to verify if $v_j \in V_C$ is in $VQ_i)_r$. If not, it simply returns ∅. Otherwise, it copes with two cases, given different optimality of $GQ_i$.

Optimal $GQ_i$. When $GQ_i$ is an optimal minimum spanning tree (MST) for its content nodes, ReOPT invokes the bounded procedure SSP (vj, $VQ_i$, r) as in the algorithm AR-DR, to find the "closest" tree nodes u in $GQ_i$ vj can reach in r hop. It then constructs anew content preserving answer Tij with vj and u by appending a shortest path from vj to u. This simple computation already guarantees a 1.5-approximation for the optimal content preserving answer. To see this, an approximation preserving reduction from Ij to an instance of a MST reoptimization problem is constructed with single terminal node insertion. The procedure ReOPT simulates a 1.5-approximation which finds an edge of smallest weight from a new terminal node to the given optimal MST.

The AR-ST problem may be reduced to ReOPT as follows. Given VC, the idea is to decompose AR to k|VC|sub-problems, where the instance Iij (i∈[1, k] and j∈[1, |VC|]) of each sub-problem contains $Q' = Q \cup \{t\}$, a single answer G $Q_i$, and a content node vt∈VC.

Each instance Ii$_j$ is reduced to an instance of the reoptimization problem (ReOPT) for minimum weighted Steiner trees. An instance I=(G', VT, v) of ReOPT consists of a weighted graph G', a set of terminals (required nodes) VT, an optimal or approximate Steiner tree T that contains VT, and a new terminal node v. The problem is to compute a new optimal Steiner tree T' in G' that contains VT∪{v}.

An approximation preserving reduction from AR-ST to ReOPT is constructed. Given two optimization problems P1 and P2, the reduction consists of a pair of functions (ƒ, g), where ƒ maps an instance I1 of P1 to an instance I2 of P2, and g maps an α-approximate answer A2 of I2 to an answer A1 of I1 with a guaranteed approximation ratio decided by α.

Given an instance Iij=(G $Q_i$, Q', vt, G) of AR-ST, the reduction constructs an instance I$_{i,j}$=(G', VT$_i$, v'$_i$) of ReOPT as follows.

(1) Function
ƒ sets G'=G, VT$_i$=G $Q_i$, and v'$_i$=vt. (2) Function g maps the answer T' of instance Ij to G $Q_i$. It can be verified that the above construction is an approximation preserving reduction, which guarantees the same approximation ratio for AR-ST as in ReOPT.

Recall the answer Q2(G) in FIG. 3B. The query evaluation component computes a Steiner tree by adding to the Steiner tree Q$_2$(G) the portion ΔE (316) shown in FIG. 3D that is induced by the backward traversal from its content nodes. While the refined answer of query Q'$_2$ = Q$_2$∪'Emilio' guarantees bounded cost, a closer observation shows that it does not explain the connection between the new content node 'Emilio' 312 to the ones in Q(G) well. AR-ST then finds a better Steiner tree by refining the Steiner tree Q2(G) directly. This provides a new content preserving answer with cost 0.5 (314 in FIG. 3D), which suggests that all three content nodes are scientists and Nobel Prize winners.

Approximate $GQ_i$. When the content preserving answer $GQ_i$ is produced by a γ-approximation, ReOPT invokes an approximation algorithm that leverages (a) full components, which are the maximal subtrees with none but all leaves as terminal nodes, and (b) an m-restricted Steiner tree, where each full component has at most m terminal nodes. Following the teachings of Goyal, et al., "Robust reoptimization of Steiner trees," *LIPIcs-Liebniz International Proceedings in Informatics*, 2015, it iteratively eliminates each full component of $GQ_i$ and finds a replacement as m-restricted Steiner trees with no larger cost by executing an approximate Steiner tree algorithm. This yields an (10γ-7)/(7γ-4) approximation. Although this procedure copes with approximate Q(G), it is more expensive than a standard KWS that re-evaluates Q'.

One may use ReOPT for optimal Q(G) as a more practical approach for graph exploration with ST queries. For example, the approximation ratios of algorithm AR-ST are guaranteed by the guarantees of procedure ReOPT, which can be further verified by approximation preserving reduction to the reoptimization of MST. For both optimal or approximate Q(G), algorithm AR-ST is bounded. Specifically, it takes O(k*(∥ Q(G)∥r log∥ Q(G)∥r+∥ Q(G)∥r)) time to approximate an optimal answer with ratio 1.5 from optimal Q(G). If one considers distance from undirected shortest paths for MST, the procedure SSSP from the nodes in V$_C$ is still within Q(G)$_r$.

The number of backward BFS in ReOPT can be further reduced from $GQ_i$ to at most once by adding a "dummy node" to all tree nodes and perform in total k rounds of BFS. The optimization of AR-ST, including the boundedness for approximate Q(G), is described below.

Given an answer $GQ_i$∈ Q(G), the ReOPT process requires connecting a new content node to its closest node on $GQ_i$, no matter which tree node it is. Thus, a dummy node vs is added as the source of SSSP and connects it to all nodes on the tree with zero edge weight. Now, a single SSSP can be run for each answer in $GQ_i$ to obtain the "closest" node vi∈V$_C$ that minimizes dist(vs, vi). Suppose node vTi∈ $GQ_i$ is on the shortest path from vs to the selected vi∈VC, then to construct $GO'_i$, the ReOPT process for optimal ST simply appends the shortest path of vT$_i$→vi to G $GQ_i$. For approximate ST, this optimization aids to find an upper bound for the refined answer.

Given the answer $GQ_i$, let node vT$_i$∈ $GQ_i$ be on the shortest path from vs to its closest node vi∈VC, then dist(vs, vi)=dist(vT$_i$,vi) since vs is connected to vT$_i$ by a zero edge weight. As a preprocessing step of AR-ST, any node v∈VC which is not in the r-hop of the G $Q_i$ is pruned from VC and ReOPT is executed only if V$_C$=∅. Hence, any SSSP run from the dummy node can be terminated by at most traversing (r+1)-hops of G $Q_i$ including the edges connecting vs to G$Q_i$.

Answer Refinement for SG

Although SG query evaluation is NP-hard, it is observed that every node in an r-clique is a content node. AR problems thus "degrade" to finding an optimal augmented answer for r-cliques, given a set of content nodes V$_C$. A bounded algorithm, denoted as AR-SG, is outlined for SG queries below.

As the number r for SG queries is a distance bound, AR-SG extends the procedure SSSP (v, V$_C$, r) used in AR-DR and AR-ST to find the nodes in V$_C$ with distances (instead of hop) up to r from a node v. It invokes SSSP (v, V$_C$, r) for each node v∈ $GQ_i$, and finds the content node v$_{ci}$∈V$_c$ that minimizes the answer cost Σ$_{v∈GQi}$ dist(v$_{ci}$, v). If $GQ_i$∪{v$_{ci}$} remains to be an r-clique, AR-SG adds it to Q'(G) as a new optimal content preserving answer. This repeats until Q'(G) contains k updated answers.

Algorithm AR-SG correctly finds top-k content preserving answers, guaranteed by the correctness of SSSP. Following the analysis for algorithm QR-SG, any SSSP visits up to r'=[r/w$_m$] hop neighbors of Q(G). the time cost is thus in O(k| Q|∥ Q(G)∥$_{r'}$,log∥ Q(G)∥$_{r'}$+∥Q(G)∥$_{r'}$). This verifies that algorithm AR-SG is bounded.

Thus, upon receiving a query $Q'$ expanded from $Q$, the query evaluation component incrementally computes the answer $Q'(G)$ of $Q'$ by updating $Q(G)$ directly, without re-evaluating $Q'(G)$ from scratch. The general procedure includes dynamically identifying a small set of "edge insertions" $\Delta E$ for $Q(G)$, such that $Q'(G)$ can be approximately computed directly from $Q(G) \oplus \Delta E$ (where $\oplus$ applies edge insertions to $Q(G)$), via a fast post-processing that only visits $Q(G) \oplus \Delta E$. To find a minimal amount of edges $\Delta E$, the query evaluation component performs a backward breadth-first traversal from the content nodes of $Q(G)$ to the nearest nodes that match term t, with an estimated upper bound of answer cost bounded by $\delta F(Q(G))$, for each term $t \in Q' \setminus Q$. $\Delta E$ consists of all the edges visited by the traversals.

Under the practical setting that the content nodes of $Q(G)$ should be preserved by $Q'(G)$, incremental approximation algorithms compute $Q'(G)$ with various optimality guarantees to cope with NP-hard KWS queries (summarized in the table below). The algorithms of all the query classes are special cases of the general procedure, by setting $\Delta E$ accordingly. For example, for ST queries, the query evaluation component guarantees a 1.5-approximation for $Q'(G)$ when $Q(G)$ is an optimal answer by setting $\Delta E$ as the shortest paths that minimize the distance from some node of G $Q$ to a content node of t, for each G $Q \in Q(G)$ and term $t \in Q' \setminus Q$.

Thus, bounded graph exploration exists for all the three query classes DR, ST and SG with guaranteed answer quality. $Q'(G)$ may be incrementally computed by updating $Q(G)$ directly without performing a re-evaluation from scratch. Performance (optimality guarantees) of the incremental evaluation for each KWS query class under a content preserving assumption is summarized in the table below.

| | Performance of Incremental Evaluation | |
|---|---|---|
| KWS query classes | Incremental Evaluation Time Cost | Optimality |
| Distinct-rooted trees | $O(\|Q(G)\|r \log\|Q(G)\|r + \|Q(G)\|_{2,r})$ | Optimal |
| Steiner trees | $O(k * (\|Q(G)\|r \log\|Q(G)\|r + \|Q(G)\|r))$ | 1.5-approx (optimal Q(G)) |
| Subgraphs (r-cliques) | $O(k \|Q\| \|Q(G)\|r \log \|Q(G)\|r + \|Q(G)\|r)$ | Optimal |

EXPERIMENTAL EVALUATION

Using real-life graphs, three sets of experiments were conducted to evaluate (1) the effectiveness of quality-aware graph exploration; (2) the efficiency of quality-aware graph exploration, and the impacts of query complexity and graph size; and (3) a case study to evaluate diversified query refinement for effective knowledge exploration, compared with Query-By-Example and Co-occurrence based methods.

The following experimental setting was used:

Datasets: (1) DBpedia, a knowledge graph that contains 4.8M multi-labeled entities, in total 1.5M keywords from both entity names and their type information (e.g., "Place", "Obama"), and 15M edges with 670 distinct relationships. (2) Citation is a citation network of 4.3M entities (e.g., papers, authors, publication venues), 16.8M edges including 3 edge types such as cited, published at, and written by. The dataset contains 979K tokens extracted from the title of papers, venues, and author names. (3) IMDB is an information network including 1.6M entities of movies, TV shows, and crews. It contains 5.1M edges and 1.4M tokens from, for example, genre and titles of movies, and the name of crews.

KWS queries: The query generation is controlled by the size of $Q$ ($|Q|$) and a hop bound r. The queries are sampled using a random walk with restart. To construct $Q$, the random walk starts from a random origin in a graph G to visit its r-hop neighbors multiple times. $Q$ is constructed with top-ranked keywords with high TF-IDF score in its r-hop neighbors, to ensure the existence of reasonable answers.

Algorithms: The following algorithms were implemented to support graph exploration with DR, ST, and SG queries, respectively: (1) The bounded query refinement algorithms QR-DR, QR-ST, QR-SG; (2) the bounded answer refinement algorithms AR-DR, AR-ST, and AR-SG; (3) "From-scratch" query evaluation algorithms Eval-DR, Eval-ST, and Eval-SG, which extend their standard KWS counterparts to multi-labeled graphs; and (4) algorithm DivQR that invokes QR-DR, QR-ST, and QR-SG for diversified graph exploration. Specifically, (a) Eval-DR invokes Bidirectional Search for DR queries; (b) Eval-ST invokes GST-k which finds optimal top-k answers for ST queries; and (c) Eval-SG uses a 2-approximate algorithm to discover r-cliques for SG queries. For a multi-labeled graph, these algorithms find content nodes by checking label containment.

Three query refinement methods were also implemented that are applicable to KWS in graphs. (1) A co-occurring terms algorithm (CoOcc) suggests new terms to a query $Q$ that most frequently occur in its answer $Q(G)$. (2) TagCloud finds "search entities" in a graph G. Each search entity is a star graph that contains a center content node that contains keywords in $Q$ and its neighbors in G. It returns top keywords determined by TagCloud score, computed by TF-IDF over search entities relevant to $Q$. (3) Query by example (QBE) takes as input query tuples (keywords) and induces a maximal query graph with the neighborhood of the content nodes to find relevant triples, matched with similar edge type. Triples from $Q(G)$ are taken as "examples" to QBE.

Graph exploration: To evaluate the effectiveness of quality-aware exploration, four types of exploration were simulated.

(1) Quality-aware exploration (QA-Exp) uses specific bounded quality-preserving query and answer refinement algorithms to progressively explore graphs. For example, QA-Exp for DR queries invokes QR-DR and AR-DR for query and answer refinement in a session; similarly for ST and SG.

(2) Diversified exploration (Div-Exp) replaces query refinement algorithms in (1) with their diversified counterparts (DivQR described above), specialized for DR, ST and SG queries.

(3) Quality-aware refinement (QR-Exp) adopts quality-preserving query refinement, but uses standalone KWS algorithms (e.g., Eval-DR) to recompute the answers.

(4) Standard exploration (Standard) adopts CoOcc, TagCloud or QBE and standard KWS to recompute answers.

The experiments were conducted on a machine powered by an Intel 2.3 GHz processor with 64 GB of memory. Each test was repeated 5 times and the average is reported below.

Experiment 1: Effectiveness of Graph Exploration

The effectiveness of QA-Exp, QR-Exp, and Standard are first compared. Standard with Standard (CoOcc) and Standard (TagCloud) are specified, which use CoOcc and TagCloud to suggest refined queries, respectively. To understand their relative performance, the absolute answer cost values are normalized to a "quality loss". Given a pair ($Q$, $Q(G)$) and an output of a session ($Q'$, $Q'(G)$), the quality loss $\delta_r$ of $Q$ is defined as $(F(Q'(G)))/(F(Q(G)))-1$; the smaller, the better.

Graph explorations were simulated with two sessions. Each exploration starts from a query $Q$ with 2 keywords and refines it to $Q'$ (with 3 keywords) and refines $Q'$ to $Q''$ (with 4 keywords), respectively. 30 distinct $Q$ (and corresponding sessions) were tested and the average quality loss for DR, ST and SG queries are reported in FIG. 4A-FIG. 4D. FIGS. 4A-4H illustrate graphs of the average quality loss for DR, ST and SG queries.

Exploration with DR Queries.

Figures 4A, 4B, 4C, 4D:
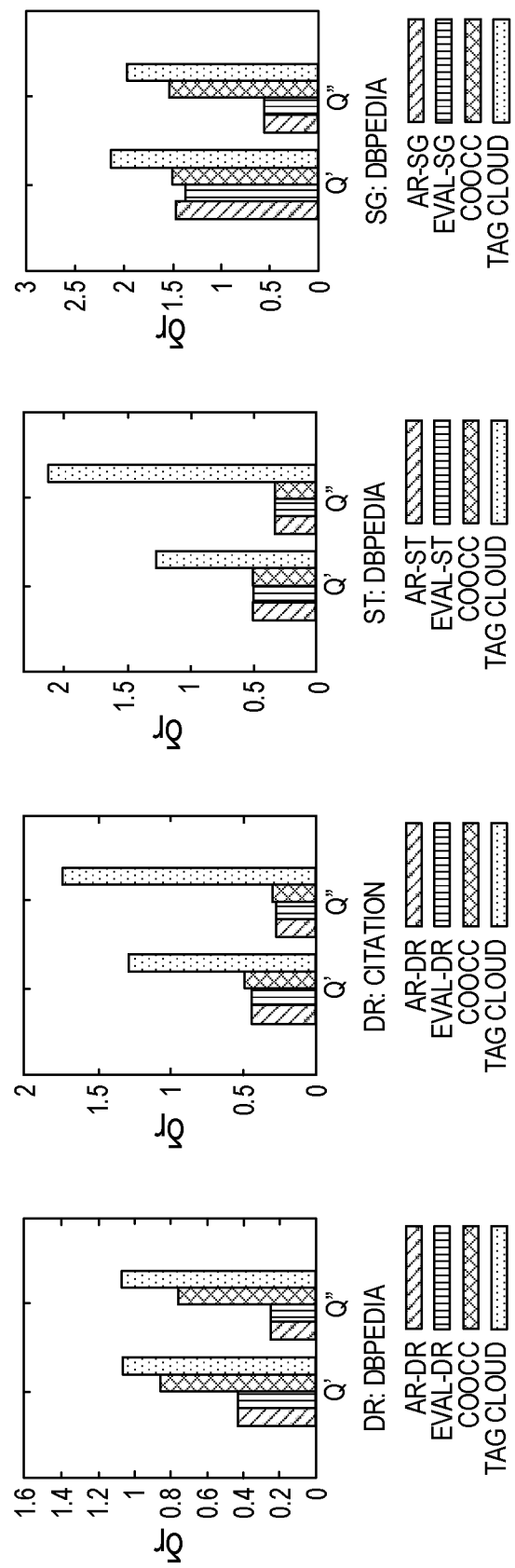
FIGS. 4A-4H collectively illustrate graphs of the average quality loss for DR, ST and SG queries.
Figure 4E:
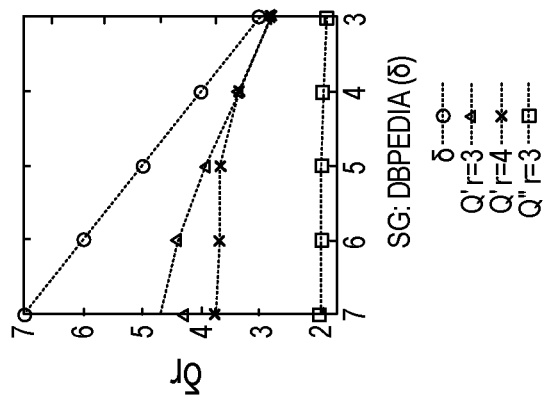
Figure 4F:
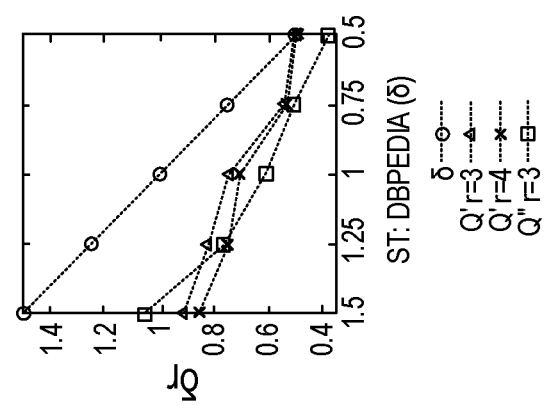

Fixing $\delta=0.5$, k=3, and r=3, the quality loss of graph exploration with DR queries is reported over DBpedia (FIG. 4A) and Citation (FIG. 4B).

Quality-aware explorations QA-Exp and QR-Exp guarantee to explore G with queries and answers with bounded quality loss. This is because (a) the query refinement algorithm QR-DR only suggests queries with answers with bounded quality loss ($\leq \delta(F(Q(G)))$); and (b) given these queries, algorithm AR-DR and standard KWS further refine answers towards better quality. This verifies the effectiveness of quality-preserving query refinement QR-DR.

For both DBpedia and Citation, QA-Exp and QR-Exp generate answers with almost the same cost in all cases. Indeed, QA-Exp effectively finds content preserving answers with high quality, comparable with "globally" optimal answers by re-evaluating a query with standard KWS. This verifies the effectiveness of answer refinement algorithm AR-DR.

In contrast to QA-Exp and QR-Exp, Standard cannot provide a bounded quality loss. For example, Standard (TagCloud) suggests queries with 3.37 times worse answers compared with QA-Exp over DBpedia. Standard (CoOcc) takes a more "conservative" exploration by suggesting terms that are already seen in $Q(G)$ and producing answers with relatively lower cost compared with Standard (TagCloud). Nevertheless, it was found that Standard (CoOcc) often fails to produce refined queries and new answers after the first round in many cases, due to that CoOcc is too restrictive, and fails to suggest new terms from $Q'(G)$. To make a comparison, Standard (CoOcc) is "favored" by reporting the average quality loss over the cases they generate non-empty output.

Exploration with ST Queries

Using the same setting as FIG. 4A, the performance of graph exploration is reported in FIG. 4D over DBpedia. The performance of QA-Exp, QR-Exp, and Standard are consistent with their counterparts for DR. In particular, QA-Exp and QR-Exp find answers with quality 6.3 times better than their counterparts from Standard (TagCloud) in the second session.

Exploration with SG Queries

For all graph exploration methods with SG queries, $\delta=3$ and r=5 are set to find meaningful answers as r-cliques. FIG. 4D reports the performance for SG queries over DBpedia. QA-Exp was found to consistently outperform Standard (TagCloud) and Standard (CoOcc) and to generate high quality answers (with bounded quality loss). It is comparable with those discovered by QR-Exp with query re-evaluation.

The impact of $\delta$ and r to the quality loss of graph explorations was also evaluated. Using the same setting in FIG. 4A-FIG. 4D, the performance of QA-Exp for DR queries is reported by varying $\delta$ from 1.5 to 0.5 and setting r=3 and 4. In all cases, QA-Exp was found to guarantee to enforce smaller quality loss when $\delta$ is smaller, all bounded by $\delta$. The answer refinement algorithm AR-DR was also found to effectively improve the quality of the answer, by further reducing the quality loss of query answers. For example, when $\delta=1.5$, it generates answers with quality loss up to 0.65 for $Q''$, over both DBpedia and Citation. The results shown in FIG. 4E-FIG. 4H show that when $\delta$ is small, increasing r does not affect the quality loss due to pruning of search space by $C_p$ given the fixed $\delta$.

Figure 4G:
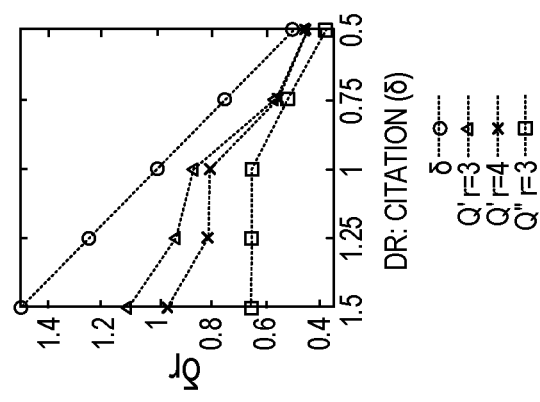
Figure 4H:
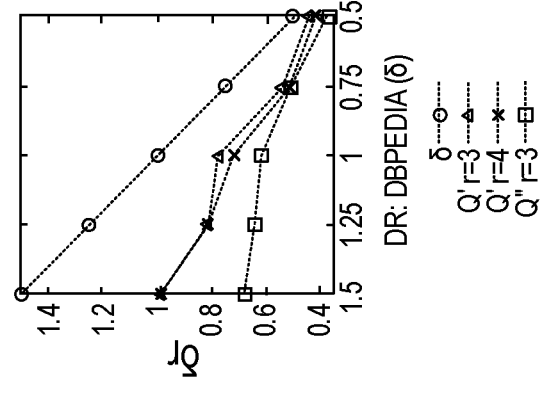

FIG. 4G and FIG. 4H report the quality loss of QA-Exp for ST and SG queries over DBpedia. The results are consistent with their counterparts in FIG. 4A for DR. Specifically, algorithm AR-SG guarantees to find answers with a quality loss up to 30% of the bound $\delta$, for SG queries $Q''$.

Experiment 2: Efficiency of Graph Exploration

Experiment 2 is designed to evaluate the efficiency of quality-aware query refinement and answer refinement. $Q=3$ and r=3 are fixed for all query classes, and $\delta=0.5$ is set for DR and ST, and 3=3 is set for SG queries, unless otherwise specified. k=3 (top-3 answers) is set for DR and SG, and k=1 for more expensive ST. 50 refined queries are used from graph explorations, and the average response time per query is evaluated, regardless of the time for generating user feedback (which is not controllable). The impact of query complexity and graph size was also evaluated.

Efficiency of Answer Refinement

Answer refinement algorithms are first evaluated and compared with standard KWS that re-evaluate queries. The table below shows the following. (1) Answer refinement algorithms outperform their standard counterparts by orders of magnitude. For example, AR-ST takes no more than 16 milliseconds to compute content preserving answers for a refined query, while a re-evaluation takes 571 seconds. (2) Standard KWS are much more sensitive to larger graphs. In contrast, with localized computation, all answer refinement algorithms incur bounded cost, and are much less sensitive. Moreover, they produce answers with comparable quality (as verified in Experiment 1 above).

| | Graphs | | | | | |
|---|---|---|---|---|---|---|
| | D | R | S | T | S | G |
| | Eval-DR | AR-DR | Eval-ST | AR-ST | Eval-SG | AR-SG |
| IMDB | 9.6 s | 4.6 ms | 377.2 s | 16.0 ms | 6.7 s | 15.8 ms |
| DBpedia | 25.5 s | 3.2 ms | 256.8 s | 10.6 ms | 17.0 s | 29.1 ms |
| Citation | 142.8 s | 14.5 ms | 571.3 s | 2.6 ms | 24.0 s | 41.9 ms |

The impact of several factors for the different query types is reported below with respect to FIG. 5A-FIG. 5H. FIGS. 5A-5H illustrate the impact of parameters on the time required for the searches.

Varying $|V_C|$

As also evident in complexity analysis of answer refinement algorithms, the size of $V_C$ does not affect the performance of AR algorithms, so no results are reported.

Varying $Q$

Figure 5A:
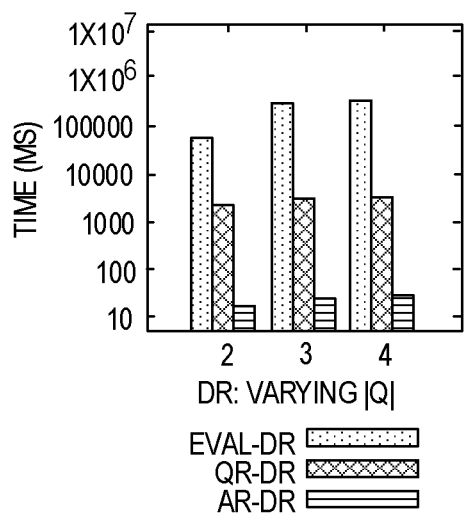
FIGS. 5A-5H collectively illustrate the impact of parameters on the time required for the searches.

FIG. 5A illustrates that both QR-DR and AR-DR take more time as the size of $Q$ becomes larger in exploration. This is because larger queries contain more nodes in $Q(G)$, and thus larger r-hop neighbors for both algorithms to explore. FIG. 5A also illustrates that AR-DR takes less time than QR-DR since during exploration it is not required to investigate the keywords and accumulate their distance information for all answers in $Q(G)$ by invoking the operators.

Figure 5B:
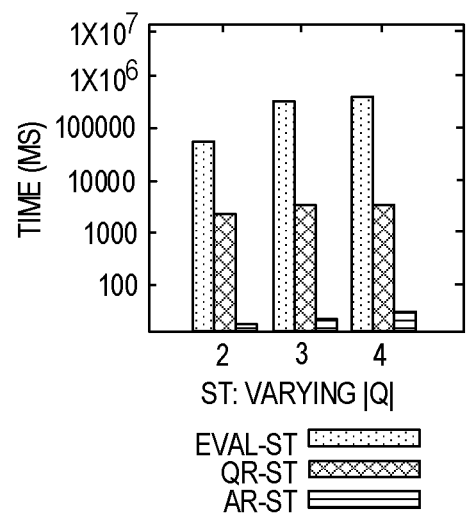
Figure 5C:
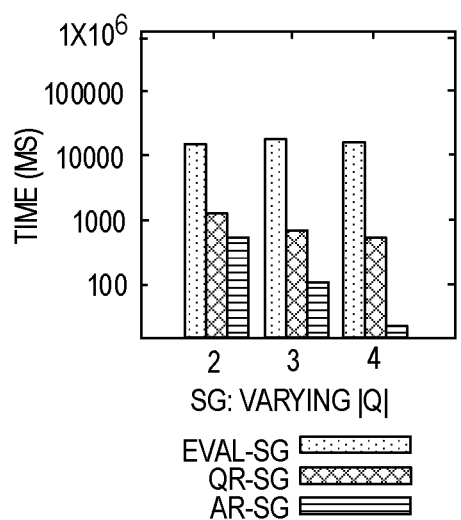

The results shown in FIG. 5B for ST queries are consistent with those for DR queries. FIG. 5C shows that Eval-SG for SG queries are less sensitive to |Q| due to its optimization that makes use of a pre-built shortest distance index. On the other hand, both QR-SG and AR-SG take less time for larger SG queries. This is because both visit less amount of data due to their pruning strategies, which works better for r-cliques with more constraints.

For all the cases, the total cost of QR-DR and AR-DR is still much less than re-evaluating a query alone. This verifies the efficiency of quality-aware graph exploratory for large G.

Varying r

Figure 5D:
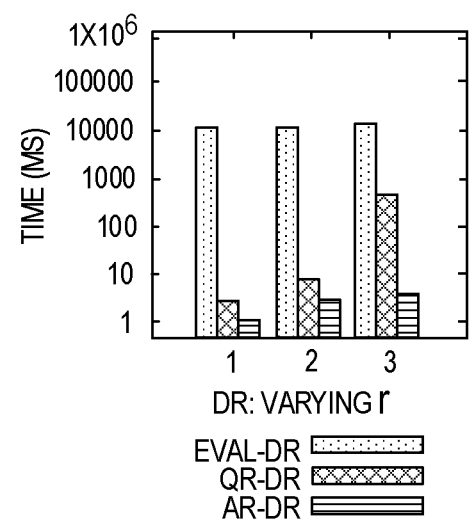
Figure 5E:
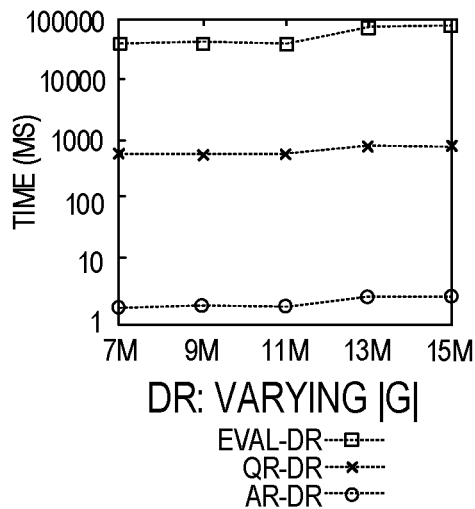
Figure 5F:
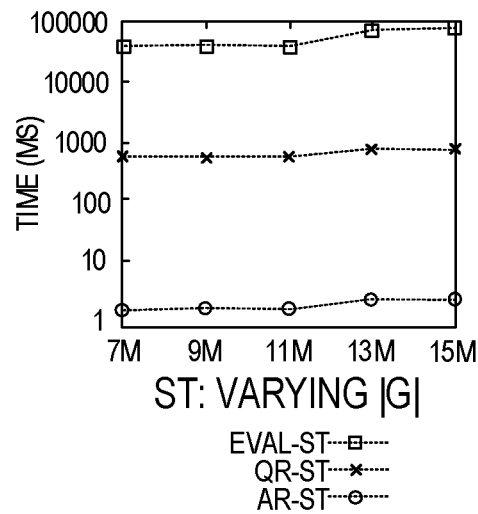
Figure 5G:
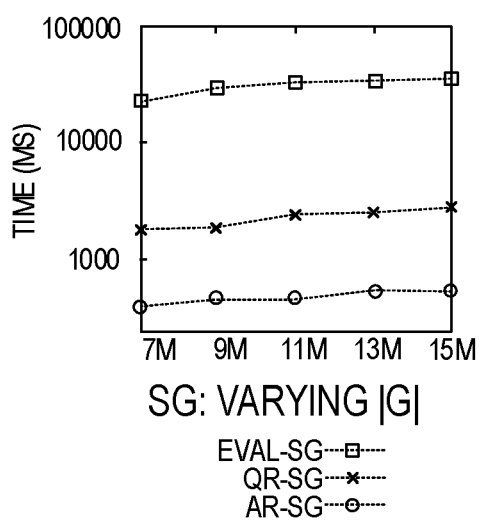
Figure 5H:
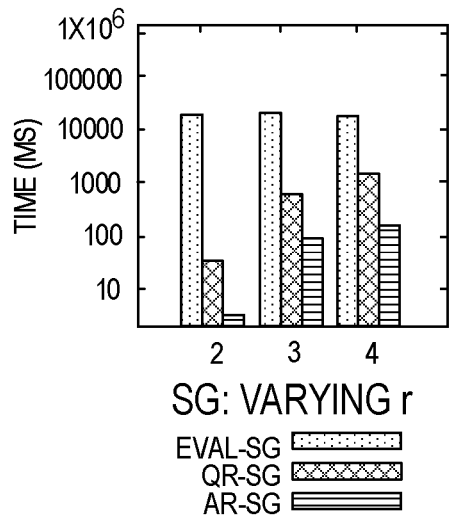

FIG. 5D and FIG. 5H verify that quality-aware graph exploration takes more time as the bound r changes, as both query and answer refinement explore larger r-hop neighbors of answer $Q(G)$.

Varying |G|

5 versions of DBpedia with edge size varied from 7M to 15M were sampled. As shown in FIG. 5E-FIG. 5F, the quality-aware query and answer refinement algorithms scale well with larger |G| and are less sensitive compared with their standalone KWS counterparts.

Experiment 3: Case Study

Case studies were conducted to evaluate the application of quality-aware graph exploration for knowledge search.

Diversified Graph Exploration

Figure 6A:
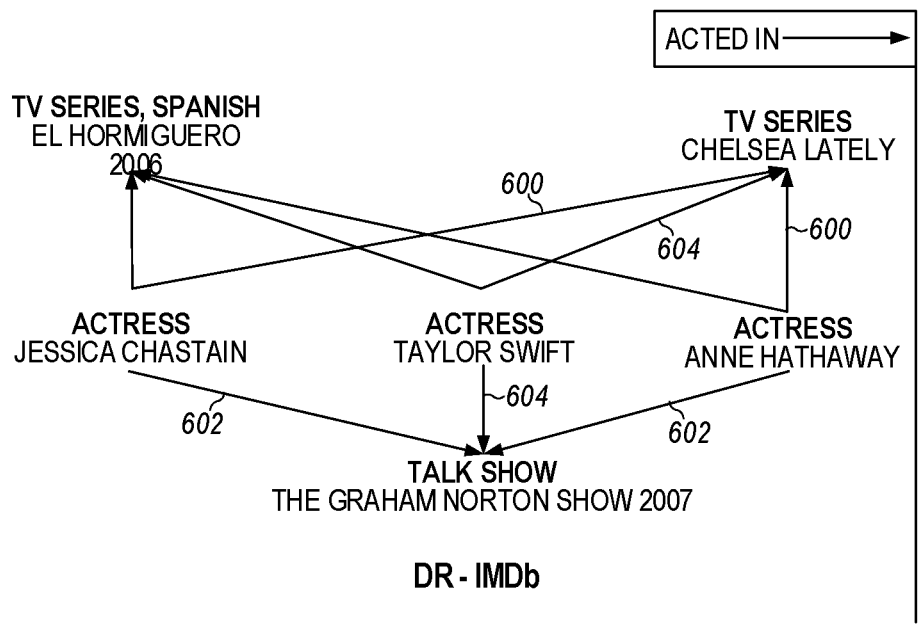
FIG. 6A illustrates a fraction of a knowledge graph G for illustrating diversified graph exploration given a DR query over the dataset IMDB.

The effectiveness was evaluated of Div-Exp, compared with Standard (CoOcc) and Standard (QBE) which suggests answers with QBE. Given a query $Q1=$ {Jessica Chastain, Anne Hathaway} over IMDB, FIG. 6A shows its top-2 answers (marked by edges 600 and 602) from Eval-DR, with cost F($Q1(G)$)=4. FIG. 6A illustrates a fraction of a knowledge graph G for illustrating diversified graph exploration given a DR query $Q1=$ {Jessica Chastain, Anne Hathaway} over the dataset IMDB.

Fixing $\delta=1$ and r=1, Div-Exp suggests the top 2 diversified keywords as 'Taylor Swift' and 'Comedy' (omitted), using TF-IDF and importance as relevance, and concept difference as a diversification function with guaranteed answer quality. Upon selecting 'Taylor Swift', DIV-Exp returns a refined answer $Q'_1(G)$ of $Q_1(G)$ by appending edges 604 to $Q_1(G)$ with a bounded quality loss (F($Q'_1(G)$)=6) which can be used for another round of refinement. By setting r=2, $Q''_1$ suggested by refining $Q'_1$, contains a "Spanish TV Series" that all the tree actresses played in, providing the user with new information to explore further.

Standard (QBE) outputs a large number of triples about two actresses who acted in the same movie, (e.g., Rebecca Hall, Scarlett Johansson), treating Jessica Chastain, Anne Hathaway in $Q_1(G)$ as input "example". These answers do not necessarily contain desirable content nodes and do not guarantee answer quality.

Standard (CoOcc) selects "Actress" as a frequent keyword that occurred on the top answers of $Q(G)$. This does not introduce new information to $Q(G)$. A re-evaluation of the query re-visits all the content nodes of "Actress".

Tuning the Quality

Figure 6B:
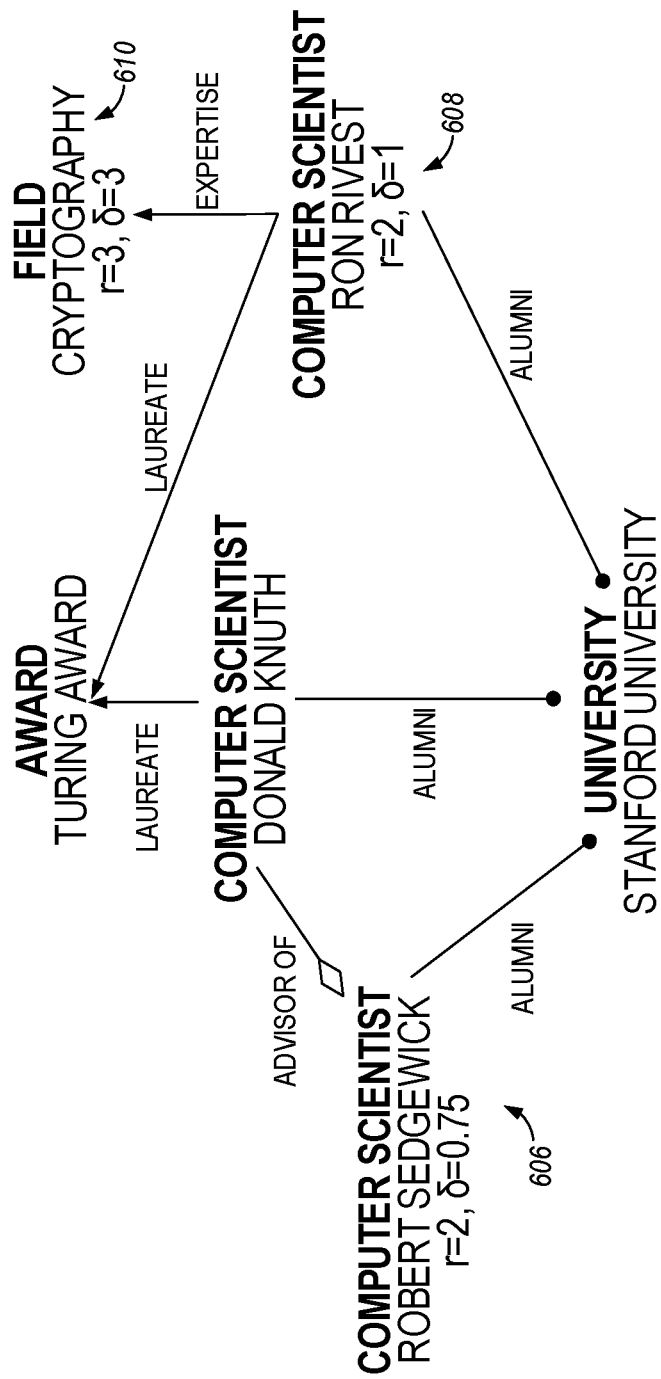
FIG. 6B illustrates a fraction of a knowledge graph G for illustrating diversified graph exploration given an SG query over the dataset DBpedia.

A user can tune the two parameters $\delta$ and r to explore more queries. An SG query $Q2=$ {Donald Knuth, Turing Award, Stanford} was studied with an answer shown in FIG. 6B (with cost 4). FIG. 6B illustrates a fraction of a knowledge graph G for illustrating diversified graph exploration given an SG query $Q2=$ {Donald Knuth, Turing Award, Stanford} over the dataset DBpedia. When $\delta=0.75$ and r=2, QA-Exp finds 'Robert Sedgewick' at 606, a Stanford alumnus and also Donald's student, which is suggested with cost bounded by 7. By setting 3 to 1 and keeping r=2, it finds a second term 'Ron Rivest' at 608, a Stanford alumnus and also a Turing Award winner, with answer cost 8. With $\delta=3$ and r=3, it finds the expertise of 'Ron Rivest' as "Cryptography" at 610.

It is also found that by tuning $\delta$ and r, QA-Exp can explore G with the same results suggested by Standard (QBE), such as 'R. Rivest', as well as Standard (CoOcc) (when both are set small). This suggests that QA-Exp can be tuned to trade off "conservative" exploration (quality) with "open" exploration (new information), which is desirable in practice.

In summary, a graph exploration method with query and incremental answer evaluation (answer refinement) has been proposed that guarantees to find answers with bounded quality loss, for three common keyword query classes (DR, ST, and SG), respectively. It has been shown that the query refinement problem is tractable for all queries, and answer refinement is tractable for DR and SG queries, and approximable for ST queries. Bounded algorithms are provided for all query classes. The experimental results have verified that these bounded algorithms substantially outperform their standard KWS query refinement and evaluation counterparts, scale well with large graphs, and generate reasonable answers to guide graph exploration.

System Configuration

Generally speaking, graph exploration is an interactive sequence of search sessions. Each session takes as input a pair (Q,Q(G)) that contains a KWS query Q and its answers Q(G) (validated by users in the last session), and returns a new pair (Q',Q'(G)) that contains a new query Q' and answers Q'(G) to be validated in the next session. The exploratory system executes two building-block tasks in each session.

Figure 7:
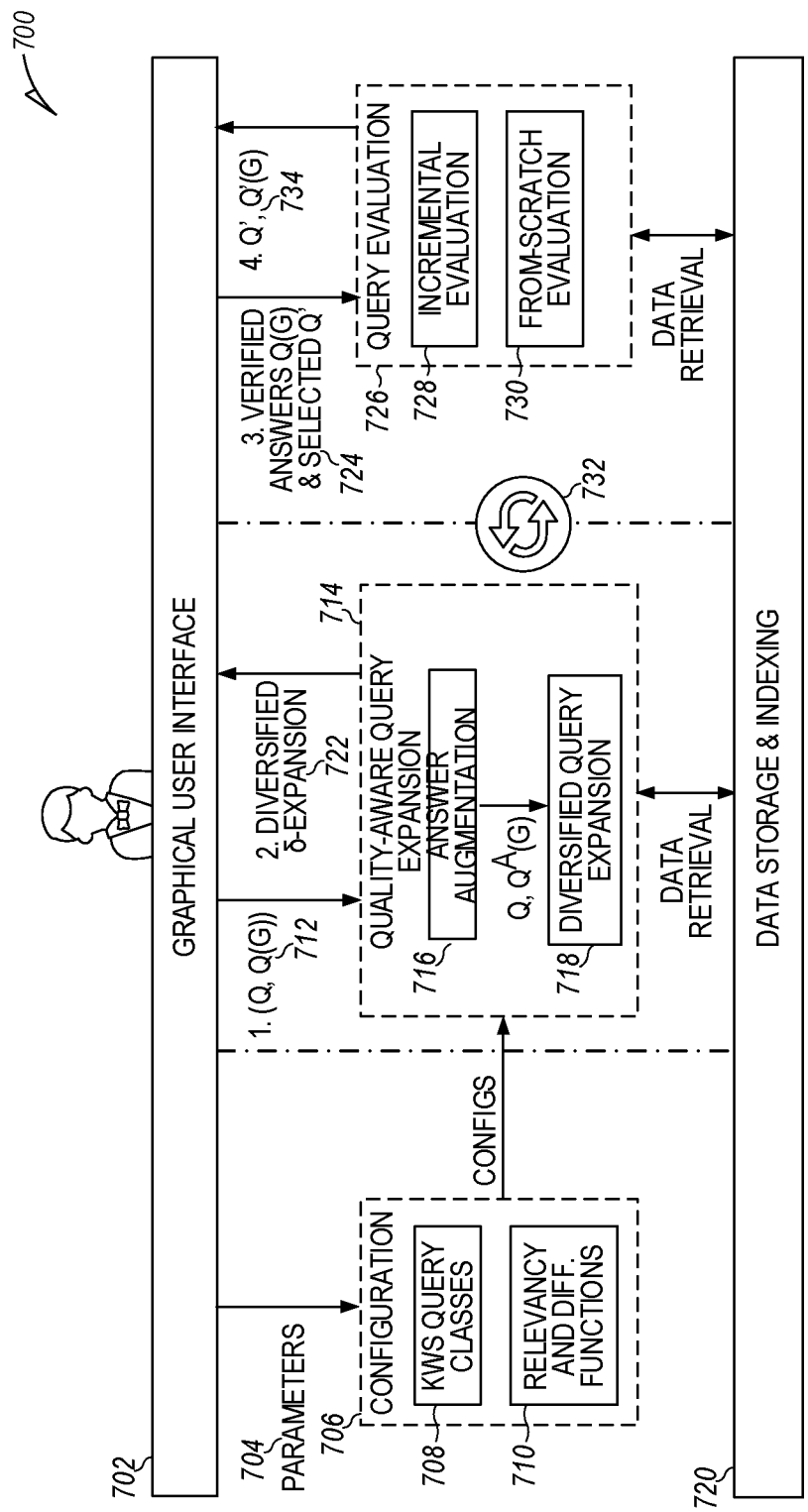
FIG. 7 illustrates a sample embodiment of a graph exploration system that implements quality-aware query expansion (refinement) and incremental query evaluation.

In a sample embodiment, the graph exploration system 700 adopts a three-tier architecture as depicted in FIG. 7. The top layer is an interactive graphical user interface 702 that allows users to perform configuration, issue and modify queries, and validate suggested queries and answers. The user-friendly GUI 702 is discussed further below with respect to FIGS. 11A-11B. The configuration component 706 receives parameters 704 from the GUI 702 and maintains built-in libraries of KWS query classes 708, relevant and dissimilarity functions (for diversified query expansion) 710, and KWS algorithms. Users may register new query classes, semantics, and algorithms via configuration of graph exploratory system 700. At the core of graph exploratory system 700 is the quality-aware query expansion component 714, and incremental query evaluation component 726. These components invoke answer augmentation, diversified query expansion (refinement), and incremental evaluation as described in detail above to construct the workflow and to execute graph exploration in sessions. The data storage and indexing layer 720 maintained underlying graph data and supports fast distance queries and traversal operations.

Quality-aware query expansion. Upon receiving a pair (Q,Q(G)) 712 (Step 1 in FIG. 7), the quality aware query expansion module 714 computes a set of new queries Q', where each query Q' expands Q with a set of new terms. The quality aware query expansion module 714 includes an answer augmentation module 716 and diversified query expansion module 718 to implement the corresponding features described in detail above for each query class. The quality aware query expansion module 714 only generates queries that have answers with a bounded cost, specified by a user-defined, tunable answer cost threshold. The quality aware query expansion module 714 returns diversified δ-expansion Q' to users via GIU 702 for validation at 722 (Step 2 in FIG. 7). Users can select suggested queries or update Q with their own terms via GUI 702.

Incremental query evaluation. Upon receiving a specified query Q', along with original query Q and answers Q(G) 724 (Step 3 in FIG. 7), the query evaluation module 726 computes the answers Q'(G) by incrementally updating Q(G) at 728, without re-evaluating Q' from scratch. Thus, while the from-scratch evaluation 730 is used to process the initial query, it is not used to re-evaluation Q'. The query evaluation module 726 returns the pair (Q',Q'(G)) for validation at 734 (Step 4 in FIG. 7) by the user via GUI 702, or directly triggers the next session at 732. For each session, users can specify an ad-hoc query class and alter the cost threshold to alter the graph exploration.

As noted above, the exploratory system supports quality-aware graph exploration with three established KWS query classes including:

Distinct root-based queries (DR) search for trees with distinct root and bounded depth r. The answer cost of a tree $G_Q$, determined by a cost function $F(G_Q)$, is computed as the sum of distances from each content node to its root $v_r$.

Steiner tree-based queries (ST) compute minimum weighted Steiner trees with bounded depth r, where the cost $F(G_Q)$ of a tree $G_Q$ is the sum of its edge weights.

A class of Steiner graph-based queries (SG) computes r-cliques, where the cost $F(G_Q)$ of an r-clique $G_Q$ is the total pairwise distance among the content nodes.

A built-in library is maintained by the configuration module 706 to bookkeep registered KWS query classes, cost models, and query evaluation algorithms. By default, the cost of Q(G) is defined as the sum of the answer cost $F(G_Q)$ for each $G_Q \in Q(G)$. New KWS query classes, algorithms and cost functions can be easily plugged into the exploratory system.

Given k initial validated answers, the quality-aware query expansion module 714 performs k rounds of local traversal. Each traversal starts from a set of source nodes $V_{S_i}$ in the i-th answer of $G_{Q_i} \in Q(G)$ and visits up to a bounded hop of their neighbors using a single source shortest path (SSSP) iterator. Specifically:

(1) For an SSSP at an answer $G_{Q_i}$ and each term t carried by a visited node v, the exploratory system computes the additional cost if the initial answer $G_{Q_i}$ is extended to an augmented structure $G_{Q_i}^A$ for a query Q'=Q∪{t}, by "appending" shortest paths from the source node $V_{S_i}$ to the current visited node v.

(2) When all SSSP's are completed, for each new term t, it computes the total additional cost ŵ introduced by extending the initial answer $G_{Q_i}$ to the augmented answer $G_{Q_i}^A$. If the added cost w is larger than a threshold $\bar{C}_p$ (set as a δ*F(Q(G)) by default), it prunes this expanded query Q∪{t}. Otherwise, it adds Q'=∪{t} as a δ-expansion.

Figure 8:
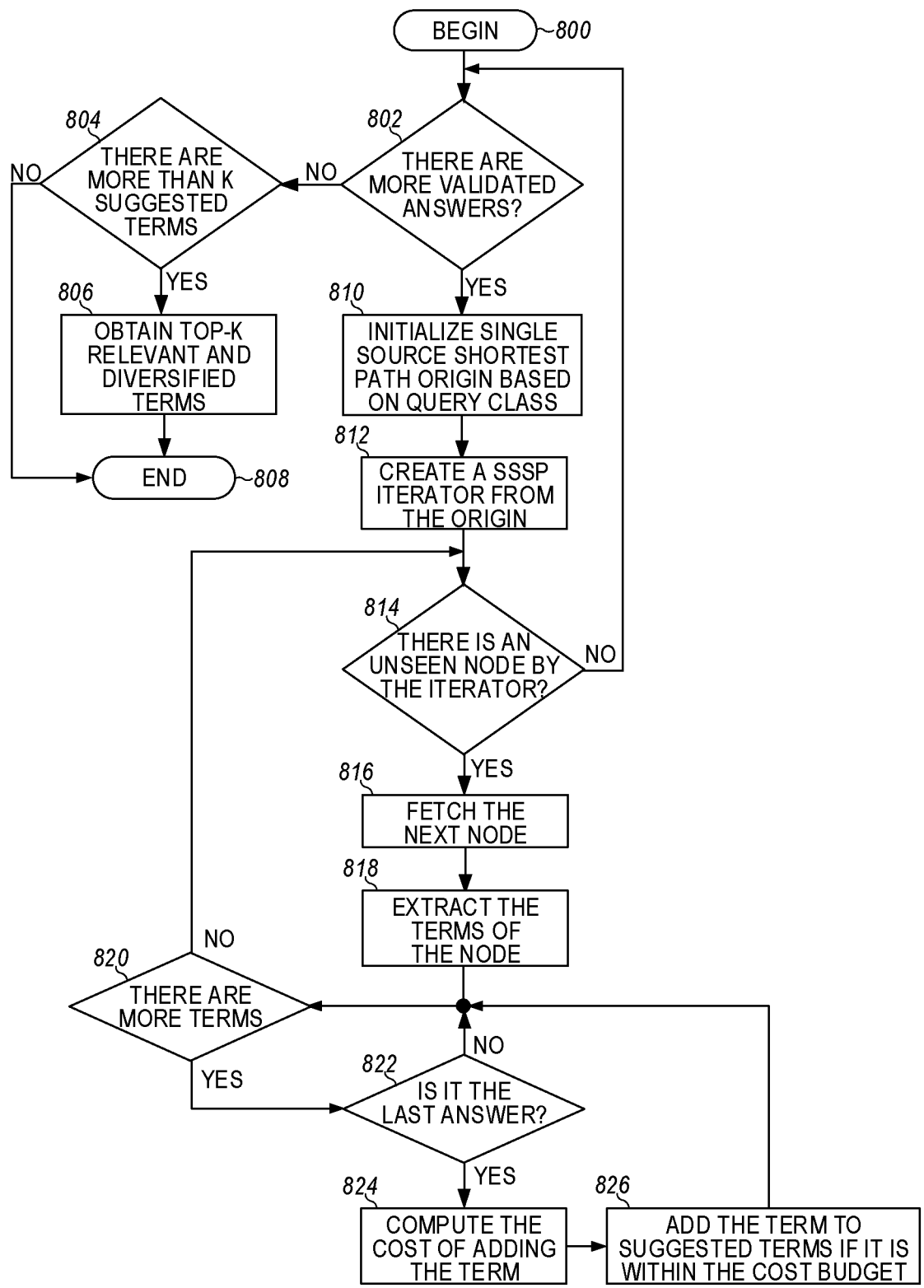
FIG. 8 illustrates a general procedure implemented by the quality-aware query expansion module for discovering the diversified and relevant δ-expansions in sample embodiments.

FIG. 8 illustrates a general procedure implemented by the quality-aware query expansion module 714 for discovering the diversified and relevant δ-expansions. As illustrated, the procedure begins at 800 and checks for validated answers at 802. If there are no more validated answers to process, at 804 the procedure checks whether there are more than k suggested terms. If so, the top-k relevant and diversified terms are determined at 806; otherwise, the procedure ends at 808.

On the other hand, if it is determined at 802 that there are more validated answers to process, a single source shortest path (SSSP) origin is initialized at 810 based on the query class DR, ST, or SG. At 812, an SSSP iterator is created from the origin, and the procedure checks at 814 for any nodes unseen by the iterator. If there are no unseen nodes, the procedure returns to 802 to check whether there are additional validated answers to process. However, if it is determined at 814 that there is an unseen node to process, the next node is fetched at 816 and the terms of the node are extracted at 818. If it is determined at 820 that the extracted terms do not contain any new terms, the procedure returns to 814 to search for another node. However, if there are new terms, the procedure checks at 822 to determine if the new term is the last answer. If not, the procedure returns to 820 to search for additional terms. Once it is determined at 822 that the extracted term is the last answer, the cost of adding the term is computed at 824 and the term is added to the suggested terms at 826 if it is within the cost budget. Otherwise, the procedure returns to 820 to determine if there are more terms to process. The procedure repeats until it is determined at 802 that there are no more validated terms to process.

Figure 9:
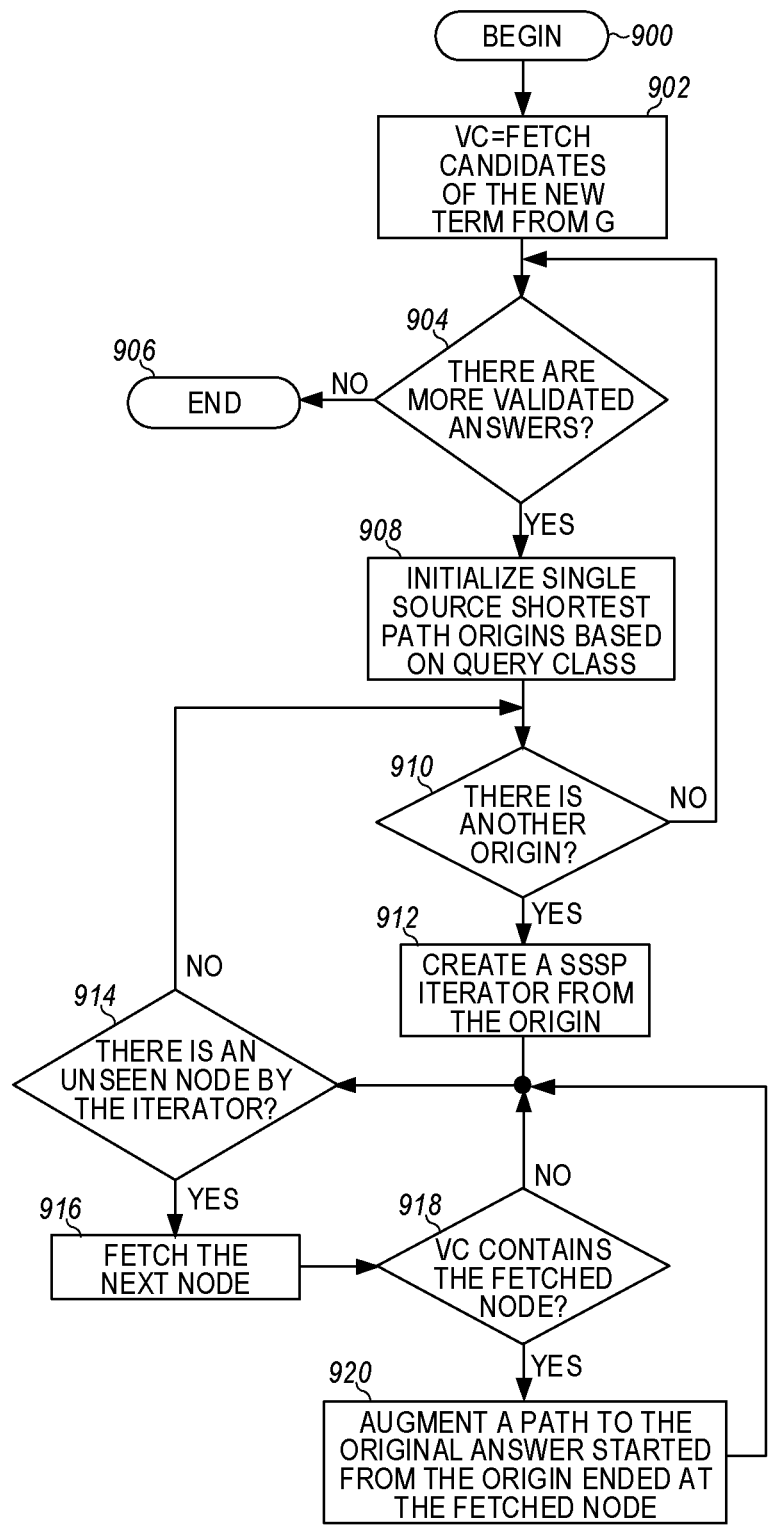
FIG. 9 illustrates a sample embodiment of an incremental query evaluation implemented by the query evaluation module.

FIG. 9 illustrates a sample embodiment of an incremental query evaluation implemented by the query evaluation module 726. As illustrated the procedure begins at 900 and fetches candidates of the new term from G at 902. If it is determined at 904 that there are no more validated answers, the procedure ends at 906. Otherwise, the procedure initializes single source shortest path (SSSP) origins based on query class DR, ST, or SG at 908. If it is determined at 910 that there are no other origins to process, the procedure returns to 904 to check for more validated answers. Otherwise, an SSP iterator from the origin is created at 912. If no additional unseen nodes are found at 914, then the procedure returns to 910 to check for another origin. However, if another node is found, the next node is fetched at 916 and it is determined whether the set of content nodes $V_C$ contains the fetched node. If not, the procedure returns to 914 to determine if there is another node to process. Otherwise, the path to the original answer starting from the origin and ending at the fetched node is augmented at 920. The procedure repeats until there are no more validated answers to process.

The exploratory system specializes the above procedure for DR, ST, and SG, by simply specifying $V_{S_i}$ as the root of $G_{Q_i}$ for DR and the node set of $G_{Q_i}$ for ST and SG, respectively. For all cases, the exploratory system incurs bounded time costs determined by the size of r-hop neighbors of Q(G) (denoted by $Q(G)_r$) and k.

Figure 10:
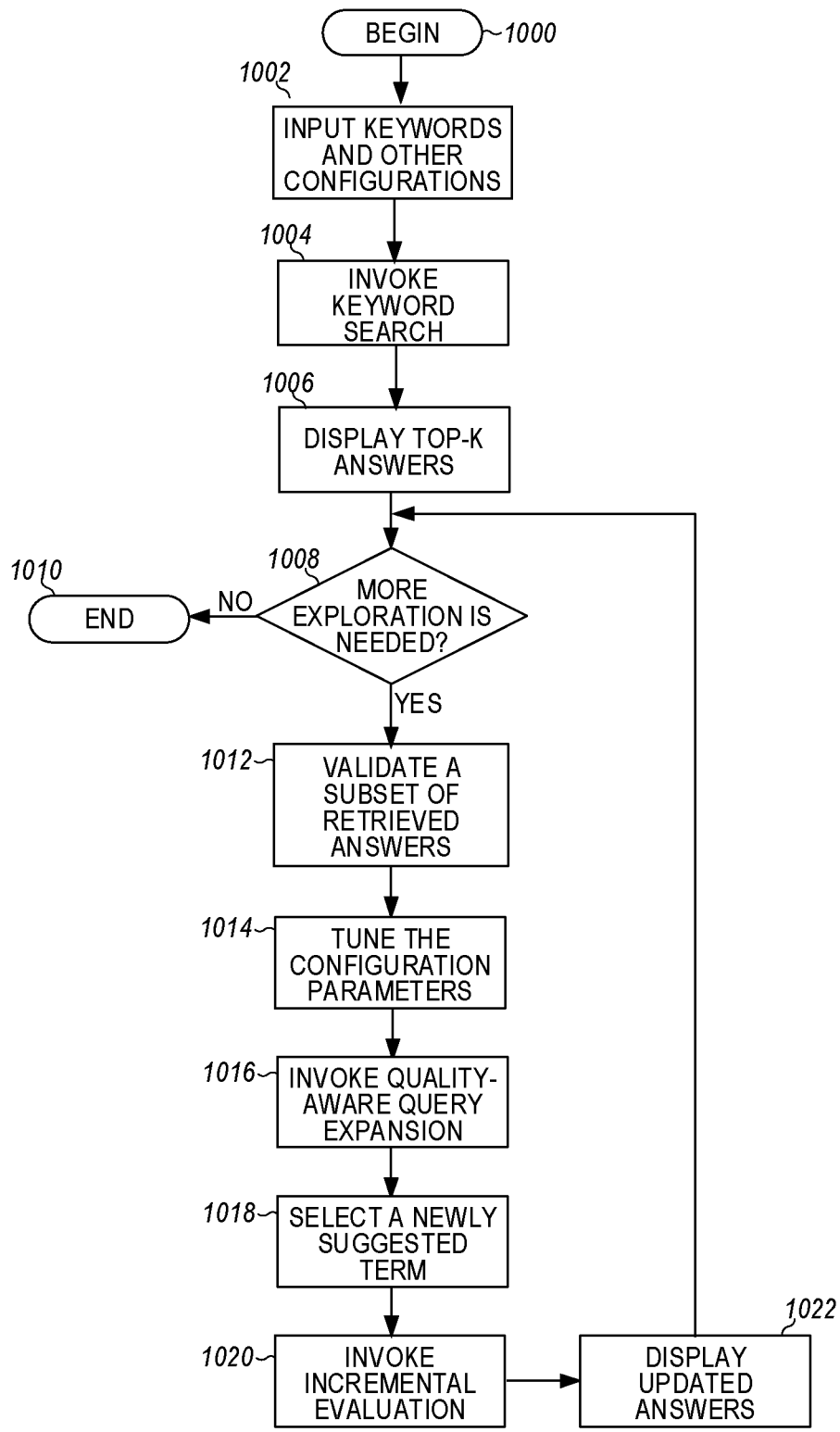
FIG. 10 illustrates the flow of an interactive exploratory search using the system illustrated in FIG. 7.

FIG. 10 illustrates the flow of an interactive exploratory search using the graph exploratory system 700 illustrated in FIG. 7. As illustrated, the search process begins at 1000 by accepting input and other configurations (parameters 704) from the user via GUI 702 at 1002. A keyword search is invoked at 1004 and the top-k answers are displayed at 1006 in a conventional manner. If it is determined at 1008 that no additional exploration is needed, the search process ends at 1010. However, if more exploration of the graph is needed, a subset of the answers presented at 1006 is validated by the user at 1012 via the GUI 702. The user is also presented with the opportunity to tune the configuration parameters (e.g., r and δ) at 1014. The query Q and validated answers Q(G) are then processed by invoking the quality-aware query expansion module 714 at 1016 to generate additional diversified δ-expansion terms 722 for user selection at 1018 via GUI 702. Incremental evaluation of the selected suggested term is performed at 1020 by invoking the query evaluation module 726. The updated answers Q'(G) for Q' are displayed at 1022 via GUI 702. This process repeats until it is determined at 1008 that no more exploration is needed.

Figure 11A:
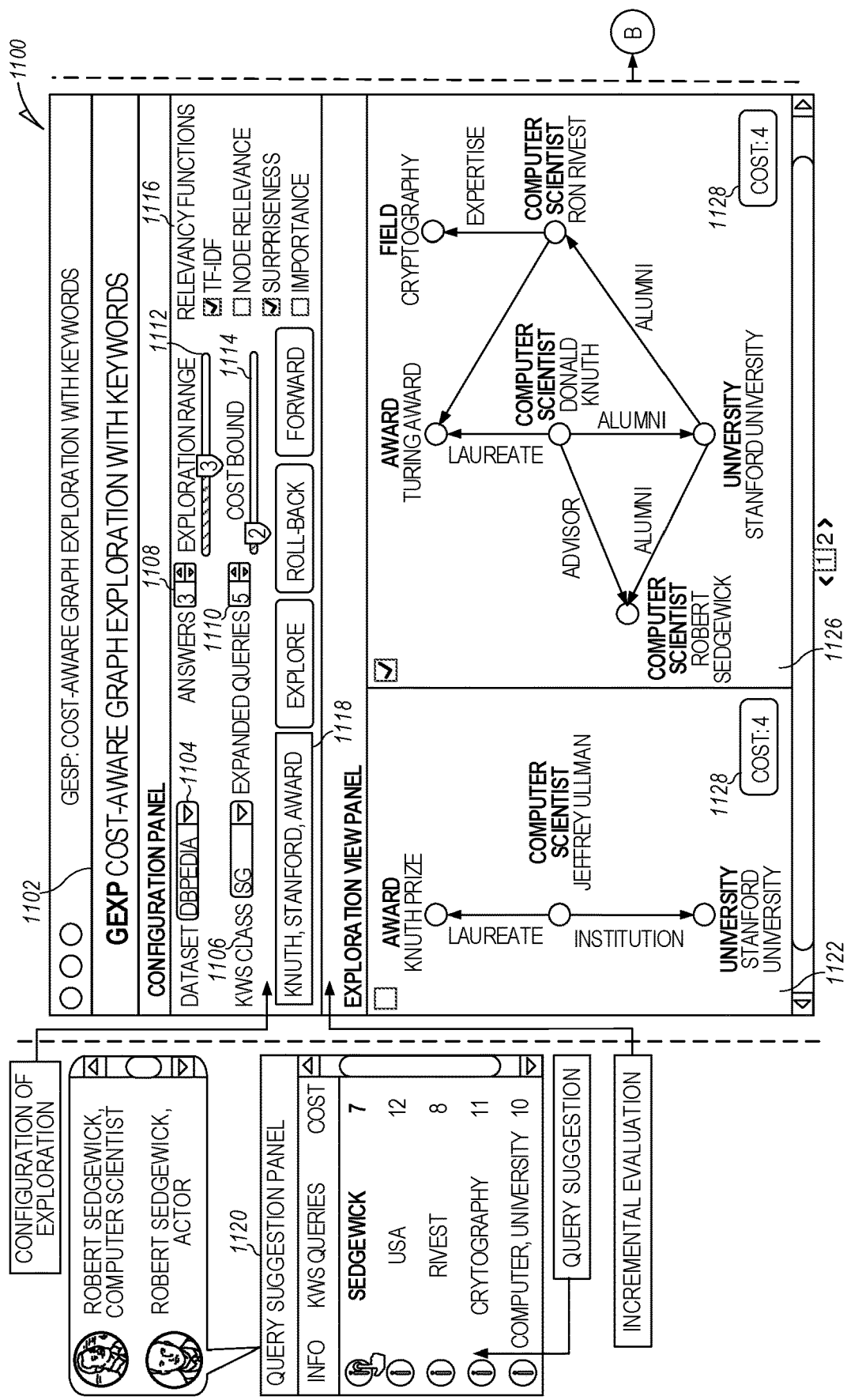
FIGS. 11A-11B illustrates a sample interactive interface for an interactive graph exploratory search in a sample embodiment.

FIG. 11A illustrates an interactive graph exploratory search using a sample interactive interface 1100 presented by the user-friendly GUI 702. Accessing the "Configuration" panel 1102 during any session, users may configure the graph exploration by selecting the dataset at 1104 and KWS query class at 1106 as well as the number of answers (k) at 1108 and the number of expanded queries 1110. The users may also tune the exploration range (the size of answers r) at 1112 and set the quality (cost) bound δ at 1114. The user may also set the relevancy and diversification functions at 1116. The users can monitor and validate the answers to queries entered in search box 1118 to tune the query expansion/refinement. The suggested terms, cost estimation, and description of their matches are visualized in the "Query Suggestion" panel 1120. The answers are updated upon the selection of new queries and are visualized in the "Exploration View" panel 1122. The cost analysis is displayed in "Performance" panel 1124.

A user can tune the exploration by adjusting the parameters δ and r to control the exploration at any time. For example, an ambiguous SG query $Q_2$={Knuth, Award, Stanford} with two answers are depicted in panel 1126 in FIG. 11A. It is assumed that the user is interested in exploring more about answer 2 related to Donald Knuth. By setting δ=0.75 and r=2, the quality-aware query expansion module 714 finds 'Sedgewick' as a new term with answer cost bounded by 7 and matched by 'Robert Sedgewick', a Stanford alumnus who is Donald's student. By tuning δ to 1 and fixing r=2, it finds a second term 'Rivest' with 'Ron Rivest' as a match, a Stanford alumnus and also a Turing Award winner, and with answer cost no larger than 8. With δ=3 and r=3, it discovers the expertise as Cryptography. As desired, the search cost is displayed to the user via cost boxes 1128. These scenarios suggest that the exploration can be tuned to switch between more "conservative" (with lower cost) or more "open" exploration (with more tolerance for quality loss).

Figure 11B:
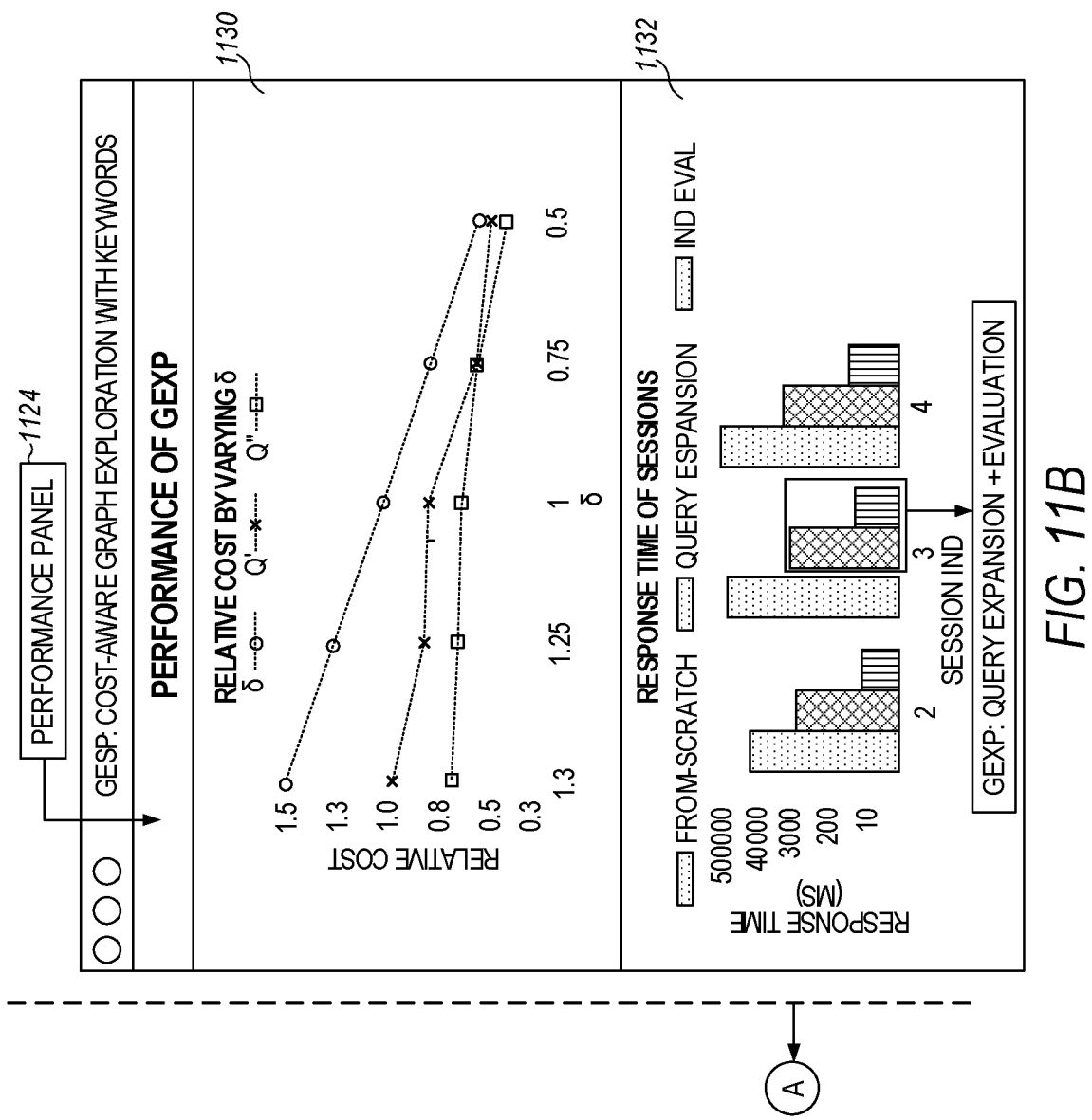

The cost analysis for query expansion (refinement) and incremental evaluation of the sessions is visualized in "Performance" panel 1124. Two charts are shown in FIG. 11B that demonstrate the impact of δ on the cost of query answers, and the response time of sessions, respectively, averaged over 50 queries. For example, chart 1130 illustrates the relative cost when δ is varied, while chart 1132 illustrates the response time of sessions from scratch versus query expansion and incremental evaluation as implemented in sample embodiments. These charts 1130 and 1132 demonstrate that quality-aware graph exploration is feasible over large data graphs and that the time cost for incremental query evaluation is much less than its counterpart incurred by from-scratch evaluation (KWS algorithms).

As described above, the interactive interface 1100 also enables users to experience quality-aware exploration with diversified queries. For example, a DR query $Q_1$={Jessica Chastain, Anne Hathaway} with δ=1, r=1, and n=2 is posed to the IMDB dataset and its top-2 answers are validated by the user. Using TF-IDF as relevance and concept difference as the difference function, the graph exploration system 700 suggests the top 2 diversified keywords as 'Taylor Swift' and 'Comedy'. In the next session, by selecting 'Taylor Swift', the graph exploration system 700 returns an updated answer with a bounded cost that can also be used for further expansion. By tuning r to 2, a suggested query contains a Spanish TV series titled 'El hormiguero', which provides the user with new information about actresses who co-played in specific movies with those in $Q_1$.

Figure 12:
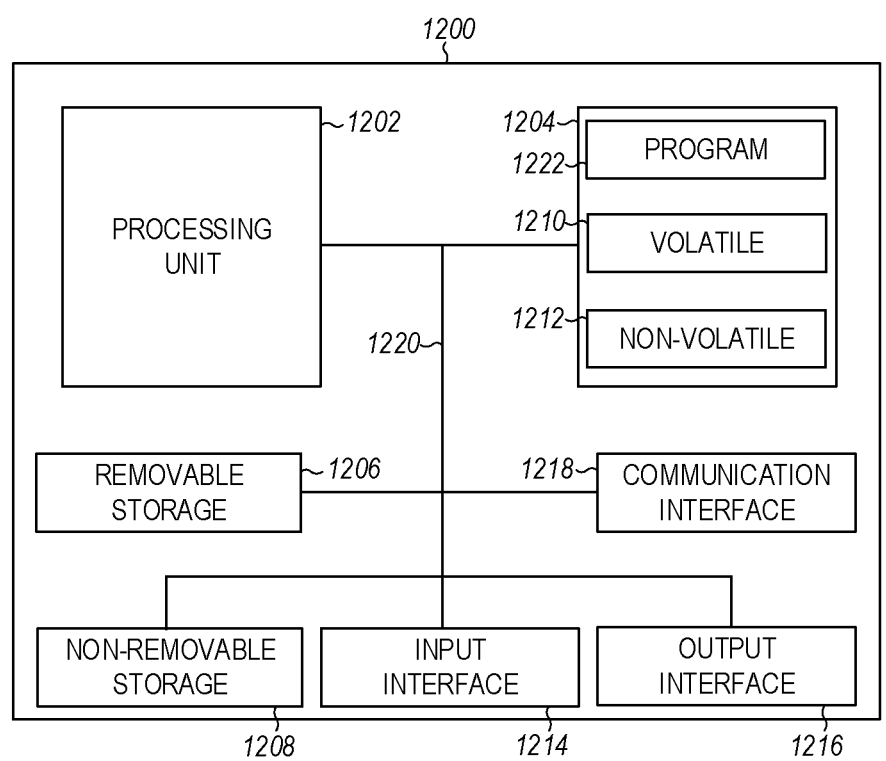
FIG. 12 is a block diagram illustrating circuitry for performing query suggestion on large networks.

FIG. 12 is a block diagram illustrating circuitry for performing query suggestion on large networks, such as knowledge graphs, social media, and e-commerce networks, and in suggesting relevant and diversified terms to expand the user's initial query such that the cost of query is bounded in both time and quality perspectives and for performing methods according to example embodiments. All components need not be used in various embodiments.

One example computing device in the form of a computer 1200 may include a processing unit 1202, memory 1204, removable storage 1206, and non-removable storage 1208. Although the example computing device is illustrated and described as computer 1200, the computing device may be in different forms in different embodiments. For example, the computing device may instead be a smartphone, a tablet, smartwatch, or other computing device including the same or similar elements as illustrated and described with regard to FIG. 12. Devices, such as smartphones, tablets, and smartwatches, are generally collectively referred to as mobile devices or user equipment. Further, although the various data storage elements are illustrated as part of the computer 1200, the storage may also or alternatively include cloud-based storage accessible via a network, such as the Internet or server-based storage.

Memory 1204 may include volatile memory 1210 and non-volatile memory 1212. Computer 1200 may include— or have access to a computing environment that includes—a variety of computer-readable media, such as volatile memory 1210 and non-volatile memory 1212, removable storage 1206 and non-removable storage 1208. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1200 may include or have access to a computing environment that includes input interface 1214, output interface 1216, and a communication interface 1218. Output interface 2126 may include a display device, such as a touchscreen, that also may serve as an input device. The input interface 1214 may include one or more of a touchscreen, touchpad, mouse, keyboard, camera, one or more device-specific buttons, one or more sensors integrated within or coupled via wired or wireless data connections to the computer 1200, and other input devices.

The computer 1200 may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, Wi-Fi, Bluetooth, or other networks. According to one embodiment, the various components of computer 1200 are connected with a system bus 1220.

Computer-readable instructions stored on a computer-readable medium are executable by the processing unit 1202 of the computer 1200, such as a program 1222. The program 1222 in some embodiments comprises software that, when executed by the processing unit 1202, performs query suggestion operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1222 may be used to cause processing unit 1202 to perform one or more methods or algorithms described herein.

In an example embodiment, the computer 1200 includes a graph configuration reception module receiving via an interactive user interface a configuration of a data graph G, keywords of a query Q, an exploration range r, and a cost threshold δ, a keyword search module invoking a keyword search of the data graph G using the keywords of the query Q, a top answers module providing top n answers Q(G) to the query Q to the interactive user interface for display, an answers selection module receiving from the interactive user interface a user selection of at least a subset of the top n answers Q(G) to the query Q, a configuration parameters module receiving via the interactive user interface adjusted configuration parameters including at least the exploration range r, a query expansion module invoking a quality-aware query expansion to compute top-n diversified δ-expansion terms Q' from a validated subset of answers Q(G) to the query Q and to provide the top-n diversified δ-expansion terms Q' to the interactive user interface for selection, whereby answers Q'(G) for the top-n diversified δ-expansion terms Q' are cost bounded by cost threshold δ and are within exploration range r, a new term module receiving a user selection of a new term of the top-n diversified δ-expansion terms Q', a query evaluation module invoking an incremental query evaluation of the new term to compute expanded query answers Q'(G) by incrementally updating the validated subset of answers Q(G), without re-evaluating an expanded query Q' including the new term from scratch, and an expanded query answers module providing the expanded query answers Q'(G) to the interactive user interface for display. In some embodiments, the computer 1200 may include other or additional modules for performing any one of or combination of steps described in the embodiments. Further, any of the additional or alternative embodiments or aspects of the method, as shown in any of the figures or recited in any of the claims, are also contemplated to include similar modules.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The following statements are potential claims that may be converted to claims in a future application. No modification of the following statements should be allowed to affect the interpretation of claims which may be drafted when this provisional application is converted into a regular utility application.

What is claimed is:

1. An apparatus for generating a query suggestion to expand an initial query such that a cost of the expanded initial query is bounded in both time and quality, comprising:
  a user interface that receives a configuration of a data graph G, keywords of a query Q, an exploration range r, a cost threshold δ, and validated answers Q(G) to the query Q from a user and presents query answers to the user;
  a non-transitory memory storage comprising instructions;
  one or more processors in communication with the memory storage and the user interface, wherein the one or more processors execute the instructions to:
    invoke a quality-aware query expansion module that receives at least a subset of validated answers Q(G) to the query Q, computes top-n diversified δ-expansion terms Q' from the subset of validated answers Q(G) to the query Q, and provides the top-n diversified δ-expansion terms Q' to the interactive user interface for selection, whereby answers Q'(G) for the top-n diversified δ-expansion terms Q' are cost bounded by cost threshold δ and are within exploration range r; and
    invoke an incremental query evaluation module that receives via the interactive user interface a selected term of the top-n diversified δ-expansion terms Q' and computes expanded query answers Q'(G) by incrementally updating the subset of validated answers Q(G), without re-evaluating an expanded query Q' including the selected term from scratch, and provides the expanded query answers Q'(G) to the interactive user interface for display; and
  a memory and indexing device that stores at least one data graph and supports distance queries and traversal operations of the identified data graph G by the quality-aware query expansion module and the incremental query evaluation module.

2. The apparatus of claim 1, wherein the quality-aware query expansion module receives k validated answers Q(G) from the interactive user interface and traverses the data graph G k times, each traversal starting from a set of source nodes in the i-th answer of Q(G), where i is the loop iteration up to k, and visits up to a bounded hop of neighbors of the set of source nodes using a single source shortest path (SSSP) iterator.

3. The apparatus of claim 2, wherein the quality-aware query expansion module processes a query Q by computing an SSSP at an answer Q(G) and at each term of a visited node of Q(G) and computes an additional cost in the event that an initial answer Q(G) were to be extended to at least one expanded query answer Q'(G) by appending shortest paths from a source node of the set of source nodes to the visited node.

4. The apparatus of claim 3, wherein when all SSSP iterations are completed, for each selected term, the quality-aware query expansion module computes a total additional cost introduced by extending the initial answer Q(G) to the expanded query answer Q'(G) including the selected term, and in the event that the total additional cost is larger than a threshold, the expanded query Q' is pruned; otherwise, the quality-aware query expansion module adds the selected term to a set of δ-expansion terms.

5. The apparatus of claim 4, wherein upon discovery of all δ-expansion terms Q' in the data graph G, the quality-aware query expansion module picks top-n most relevant and diversified δ-expansion terms Q'.

6. The apparatus of claim 4, wherein δ-expansion terms Q' for different keyword search query classes are obtained by using special source nodes for the SSSP iterations.

7. The apparatus of claim 6, wherein the special source node for a distinct-rooted tree query class is a root of an i-th answer term $G_{Qi}$.

8. The apparatus of claim 6, wherein the special source node for a Steiner tree query class and an r-clique query class is a node set of an i-th answer term $G_{Qi}$.

9. The apparatus of claim 1, wherein the incremental query evaluation module implements an incremental approximation algorithm to compute the expanded query answer Q'(G) with various optimality guarantees for different respective keyword search query classes.

10. A computer-implemented method of generating a query suggestion to expand an initial query such that a cost of the expanded initial query is bounded in both time and quality, comprising:
receiving via an interactive user interface a configuration of a data graph G, keywords of a query Q, an exploration range r, and a cost threshold δ;
one or more processors invoking a keyword search of the data graph G using the keywords of the query Q;
the one or more processors providing top n answers Q(G) to the query Q to the interactive user interface for display;
receiving from the interactive user interface a user selection of at least a subset of the top n answers Q(G) to the query Q;
receiving via the interactive user interface adjusted configuration parameters including at least the exploration range r;
the one or more processors invoking a quality-aware query expansion to compute top-n diversified δ-expansion terms Q' from a validated subset of answers Q(G) to the query Q and to provide the top-n diversified δ-expansion terms Q' to the interactive user interface for selection, whereby answers Q'(G) for the top-n diversified δ-expansion terms Q' are cost bounded by cost threshold δ and are within exploration range r;
receiving a user selection of a new term of the top-n diversified δ-expansion terms Q';
the one or more processors invoking an incremental query evaluation of the new term to compute expanded query answers Q'(G) by incrementally updating the validated subset of answers Q(G), without re-evaluating an expanded query Q' including the new term from scratch; and
the one or more processors providing the expanded query answers Q'(G) to the interactive user interface for display.

11. The method of claim 10, wherein receiving the adjusted configuration parameters comprises receiving at least one of a modified value for exploration range r that enables a user to specify how query answers may extend from a validated answer and a modified value for cost threshold δ that enables a user to specify what decrease in answer quality is tolerable.

12. The method of claim 10, further comprising providing cost data for the expanded query answers Q'(G) to the interactive user interface for display.

13. The method of claim 10, wherein computing top-n diversified δ-expansion terms Q' from the validated subset of answers Q(G) to the query Q comprises traversing the data graph G k times, each traversal starting from a set of source nodes in the i-th answer of Q(G), where i is the loop iteration up to k, and visiting up to a bounded hop of neighbors of the set of source nodes using a single source shortest path (SSSP) iterator.

14. The method of claim 13, wherein computing top-n diversified δ-expansion terms Q' from the validated subset of answers Q(G) to the query Q comprises computing an SSSP at an answer Q(G) and at each term of a visited node of Q(G) and computing an additional cost in the event that an initial answer Q(G) were to be extended to at least one expanded query answer Q'(G) by appending shortest paths from a source node of the set of source nodes to the visited node.

15. The method of claim 14, wherein computing top-n diversified δ-expansion terms Q' from the validated subset of answers Q(G) to the query Q comprises computing, when all SSSP iterations are completed, for each new term, a total additional cost introduced by extending the initial answer Q(G) to the expanded query answer Q'(G) including the new term, and in the event that the total additional cost is larger than a threshold, pruning the expanded query Q'; otherwise, adding the new term to a set of δ-expansion terms.

16. The method of claim 15, computing top-n diversified δ-expansion terms Q' from the validated subset of answers Q(G) to the query Q comprises picking, upon discovery of all δ-expansion terms Q' in the data graph G, the top-n most relevant and diversified δ-expansion terms Q'.

17. The method of claim 15, further comprising obtaining δ-expansion terms Q' for different keyword search query classes by using special source nodes for the SSSP iterations.

18. The method of claim 17, wherein the special source node for a distinct-rooted tree query class is a root of an i-th answer term $G_{Qi}$ and wherein the special source node for a Steiner tree query class and an r-clique query class is a node set of the i-th answer term $G_{Qi}$.

19. The method of claim 10, wherein computing expanded query answers Q'(G) by incrementally updating the validated subset of answers Q(G), without re-evaluating an expanded query Q' including the new term from scratch comprises computing the expanded query answer Q'(G) with various optimality guarantees for different respective keyword search query classes.

20. A non-transitory computer-readable medium storing computer instructions to generate a query suggestion to expand an initial query such that a cost of the expanded initial query is bounded in both time and quality, that when executed by one or more processors, the instructions cause the one or more processors to perform the steps of:
receiving via an interactive user interface a configuration of a data graph G, keywords of a query Q, an exploration range r, and a cost threshold δ;
invoking a keyword search of the data graph G using the keywords of the query Q;
providing top-n answers Q(G) to the query Q to the interactive user interface for display;
receiving from the interactive user interface a user selection of at least a subset of the top n answers Q(G) to the query Q;
receiving via the interactive user interface adjusted configuration parameters including at least the exploration range r;
invoking a query-aware query expansion to compute top-n diversified δ-expansion terms Q' from a validated subset of answers Q(G) to the query Q and to provide the top-n diversified δ-expansion terms Q' to the interactive user interface for selection, whereby answers Q'(G) for the top-n diversified δ-expansion terms Q' are cost bounded by cost threshold δ and are within exploration range r;

receiving a user selection of a new term of the top-n diversified δ-expansion terms Q';

invoking an incremental query evaluation of the new term to compute expanded query answers Q'(G) by incrementally updating the validated subset of answers Q(G), without re-evaluating an expanded query Q' including the new term from scratch; and providing the expanded query answers Q'(G) to the interactive user interface for display.

* * * * *